(12) United States Patent
Busto et al.

(10) Patent No.: US 11,580,709 B2
(45) Date of Patent: Feb. 14, 2023

(54) WAYPOINT CREATION IN MAP DETECTION

(71) Applicant: Magic Leap, Inc., Plantation, FL (US)

(72) Inventors: Javier Antonio Busto, Plantation, FL (US); Jonathan Brodsky, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 38 days.

(21) Appl. No.: 17/475,121

(22) Filed: Sep. 14, 2021

(65) Prior Publication Data

US 2022/0076494 A1 Mar. 10, 2022

Related U.S. Application Data

(63) Continuation of application No. 16/448,743, filed on Jun. 21, 2019, now Pat. No. 11,151,793.

(60) Provisional application No. 62/690,339, filed on Jun. 26, 2018.

(51) Int. Cl.
| | | |
|---|---|---|
| *G06T 19/00* | (2011.01) | |
| *G06T 17/20* | (2006.01) | |
| *G06F 3/01* | (2006.01) | |
| *G06T 17/05* | (2011.01) | |
| *G06V 20/20* | (2022.01) | |

(52) U.S. Cl.
CPC ............ *G06T 19/006* (2013.01); *G06F 3/011* (2013.01); *G06F 3/016* (2013.01); *G06T 17/05* (2013.01); *G06T 17/20* (2013.01); *G06V 20/20* (2022.01); *G06T 2210/12* (2013.01)

(58) Field of Classification Search
CPC ....... G06T 19/006; G06T 17/05; G06T 17/20; G06T 2210/12; G06F 3/011; G06F 3/016; G06K 9/00671
See application file for complete search history.

(56) References Cited

U.S. PATENT DOCUMENTS

| | | | |
|---|---|---|---|
| 6,850,221 B1 | 2/2005 | Tickle | |
| 9,081,426 B2 | 7/2015 | Armstrong | |
| 9,215,293 B2 | 12/2015 | Miller | |
| 9,348,143 B2 | 5/2016 | Gao et al. | |
| 9,401,044 B1* | 7/2016 | Kaufman | ................ G06F 3/011 |
| 9,417,452 B2 | 8/2016 | Schowengerdt et al. | |

(Continued)

FOREIGN PATENT DOCUMENTS

WO WO 2020/005757 1/2020

OTHER PUBLICATIONS

International Search Report and Written Opinion for PCT Application No. PCT/US2019/038471, dated Sep. 17, 2019.

(Continued)

*Primary Examiner* — Xin Sheng
(74) *Attorney, Agent, or Firm* — Knobbe, Martens, Olson & Bear, LLP

(57) ABSTRACT

An augmented reality (AR) device can be configured to generate a virtual representation of a user's physical environment. The AR device can capture images of the user's physical environment to generate a mesh map. The AR device can project graphics at designated locations on a virtual bounding box to guide the user to capture images of the user's physical environment. The AR device can provide visual, audible, or haptic guidance to direct the user of the AR device to look toward waypoints to generate the mesh map of the user's environment.

20 Claims, 32 Drawing Sheets

(56) References Cited

U.S. PATENT DOCUMENTS

| | | | |
|---|---|---|---|
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,767,616 B2 | 9/2017 | Miller | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,262,462 B2 | 4/2019 | Miller et al. | |
| 11,151,793 B2 | 10/2021 | Busto et al. | |
| 11,423,508 B2* | 8/2022 | Zhang | G06T 7/337 |
| 2005/0049780 A1 | 3/2005 | Friedrichs et al. | |
| 2006/0028436 A1 | 2/2006 | Armstrong | |
| 2007/0081123 A1 | 4/2007 | Lewis | |
| 2009/0070110 A1 | 3/2009 | Erol et al. | |
| 2009/0079732 A1 | 3/2009 | Fitzmaurice et al. | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0106832 A1 | 5/2013 | Meeker et al. | |
| 2013/0117377 A1 | 5/2013 | Miller | |
| 2013/0125027 A1 | 5/2013 | Abovitz | |
| 2013/0194256 A1 | 8/2013 | Gassmann | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267228 A1* | 9/2014 | Ofek | G06T 19/20 345/419 |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0262428 A1 | 9/2015 | Tatzgern et al. | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0148433 A1 | 5/2016 | Petrovskaya et al. | |
| 2018/0070019 A1* | 3/2018 | Laurent | G06T 7/13 |
| 2018/0253884 A1* | 9/2018 | Burnett III | H04N 13/398 |
| 2018/0300897 A1 | 10/2018 | Woods et al. | |
| 2018/0373412 A1* | 12/2018 | Reif | G06F 3/04815 |
| 2019/0369391 A1* | 12/2019 | Cordesses | A63F 13/803 |
| 2019/0392643 A1 | 12/2019 | Busto et al. | |
| 2020/0036960 A1* | 1/2020 | Shefi | H04N 13/344 |
| 2020/0054398 A1* | 2/2020 | Kovtun | G16H 40/63 |

OTHER PUBLICATIONS

International Preliminary Report on Patentability for PCT Application No. PCT/US2019/038471, dated Dec. 29, 2020.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Bogomolny, ("The Distance Formula,", 2014, https://www.cut-the-know.org/pythagoras/DistanceFormula.shtm) (Year: 2014).

Jacob, "Eye Tracking in Advanced interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Magic Leap Room Scan Youtube, screenshot, downloaded May 14, 2019. https://www.youtube.com/watch?v=dS-mpXj0T6o1 page.

Piekarski, "Interactive 3D Modeling in Outdoor Augmente4d Reality Worlds," Research Thesis for the Degree of Doctor of Philosophy, Wearable Computr Lab, The University of South Australia, 2004. http://www.tinmithnet/wayne/thesis.piekarki-ch0-start.htm.

Reitmayr, et al., "Simultaneous Localization and Mapping for Augmented Reality," Jul. 2010, ResearchGate.

Spatial Mapping, Microsoft HoloLens: Spatial Mapping, Mar. 21, 2018. https://docs.microsoft.com/en-us/windows/mixed-reality/design/spatial-mapping.

Squakenet, ("Alpha Waves Gameplay," 2014, https://www.youtube.com/watch?v=9qAtVwSIV8) (Year: 2014).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

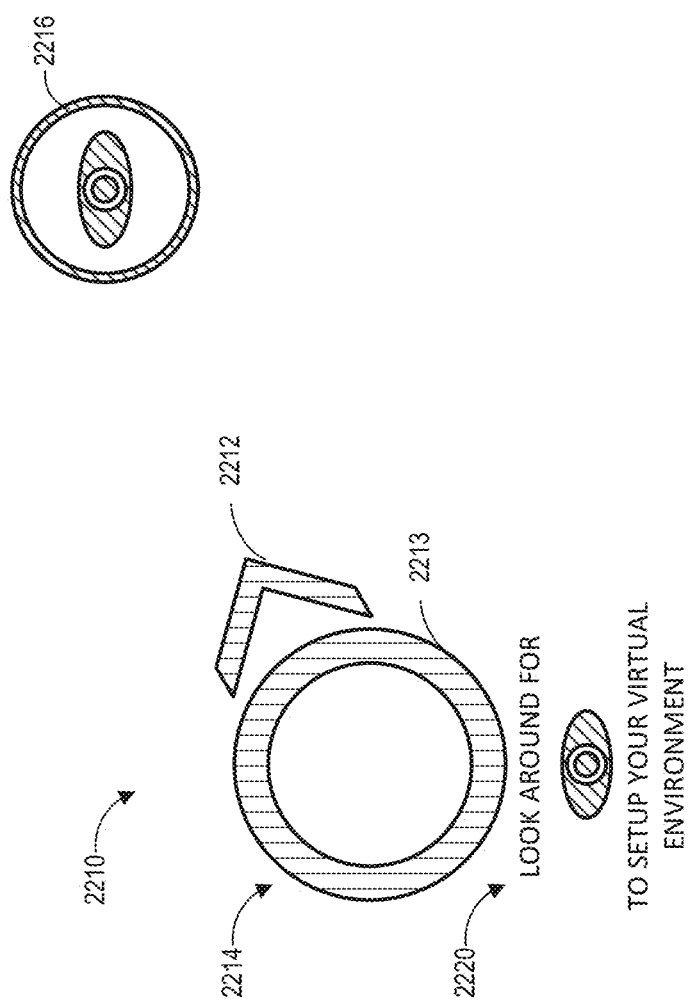

WAYPOINT CREATION IN MAP DETECTION

CROSS-REFERENCE TO RELATED APPLICATION(S)

This application is a continuation application of U.S. application Ser. No. 16/448,743 entitled "WAYPOINT CREATION IN MAP DETECTION," filed Jun. 21, 2019, which claims the benefit of priority to U.S. Patent App. No. 62/690,339 entitled "WAYPOINT CREATION IN MAP DETECTION," filed Jun. 26, 2018. This application is related to U.S. patent application Ser. No. 14/690,401 entitled "SYSTEMS AND METHOD FOR AUGMENTED AND VIRTUAL REALITY," filed on Apr. 18, 2015. This application is further related to U.S. patent application Ser. No. 15/859,277 entitled, "SYSTEMS AND METHODS FOR AUGMENTED REALITY," filed on Dec. 29, 2017, and U.S. Pat. No. 9,767,616, entitled "RECOGNIZING OBJECTS IN A PASSABLE WORLD MODEL IN AN AUGMENTED OR VIRTUAL REALITY SYSTEM," filed May 8, 2015. The contents of the aforementioned patent documents are hereby expressly incorporated by reference herein in their entireties.

FIELD

The present disclosure generally relates to systems and methods to facilitate interactive virtual or augmented reality environments for one or more users.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

Embodiments of the present disclosure are directed to devices, systems, and methods for facilitating virtual or augmented reality interaction for one or more users.

Further details of features, objects, and advantages of the disclosure are described below in the detailed description, drawings, and claims. Both the foregoing general description and the following detailed description are exemplary and explanatory and are not intended to be limiting as to the scope of the disclosure.

An augmented reality (AR) system can include: an AR display that can present virtual content to a user of the AR system; an outward facing camera that can capture one or more images of the user's environment; and a hardware processor in communication with the AR display and the outward facing camera, the hardware processor can be programmed to: generate a three-dimensional (3D) bounding box within the user's environment based on at least one image captured by the outward facing camera; determine a first waypoint location on a first surface of the 3D bounding box; determine a second waypoint location on a second surface of the 3D bounding box; generate a guidance indicator configured to direct the user to move the outward facing camera to point at the first or second waypoint location; capture map data at the first or second waypoint location; and generate a map based on the map data using one or more object recognizers, wherein the map can include a virtual representation of at a portion of the user's physical environment. The map can include a mesh map, a sparse map, or a dense map.

An augmented reality (AR) system can include: an AR display that can present virtual content to a user of the AR system; an outward facing camera that can capture one or more images of the user's environment; and a hardware processor in communication with the AR display and the outward facing camera, the hardware processor can be programmed to: receive at least one image of the one or more images captured by the outward facing camera; determine a three dimensional (3D) region within the user's environment to map based on the at least one image; generate a plurality of waypoints, each of the plurality of waypoints comprising at least one visual indicator having a spatial location in the 3D region; and cause the AR display to render a guidance visual, wherein the guidance visual is configured to direct the user to move the image capture device towards a first waypoint of the plurality of waypoints.

BRIEF DESCRIPTION OF THE DRAWINGS

Throughout the drawings, reference numbers are re-used to indicate correspondence between referenced elements. The following drawings and the associated descriptions are provided to illustrate embodiments of the present disclosure and do not limit the scope of the claims.

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIG. 22A illustrates an example guidance for a user to capture data at different waypoints.

DETAILED DESCRIPTION

A. Introduction

Virtual and augmented reality environments are generated by computers using, in part, data that describes the environment. This data may describe, for example, various objects with which a user may sense and interact with. Examples of these objects include objects that are rendered and displayed for a user to see, audio that is played for a user to hear, and tactile (or haptic) feedback for a user to feel. Users may sense and interact with the virtual and augmented reality environments through a variety of visual, auditory, and tactile means.

Virtual or augmented reality (AR) systems may be useful for many applications, spanning the fields of scientific visualization, medicine and military training, engineering design and prototyping, tele-manipulation and tele-presence, and personal entertainment. Augmented reality, in contrast to virtual reality, comprises one or more virtual objects in relation to real objects of the physical world. Such an experience greatly enhances the user's experience and enjoyability with the augmented reality system, and also opens the door for a variety of applications that allow the user to experience real objects and virtual objects simultaneously.

However, there are significant challenges in providing such a system. To provide a realistic augmented reality experience to users, the AR system should always know the user's physical surroundings in order to correctly correlate a location of virtual objects in relation to real objects. Further, the AR system should correctly know how to position virtual objects in relation to the user's head, body etc. This requires extensive knowledge of the user's position in relation to the world at all times. Additionally, these functions advantageously should be performed in a manner such that costs (e.g., energy costs, etc.) are kept low while speed and performance are maintained.

There, thus, is a need for improved systems to provide a realistic augmented reality experience to users.

B. Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

Figure 1:
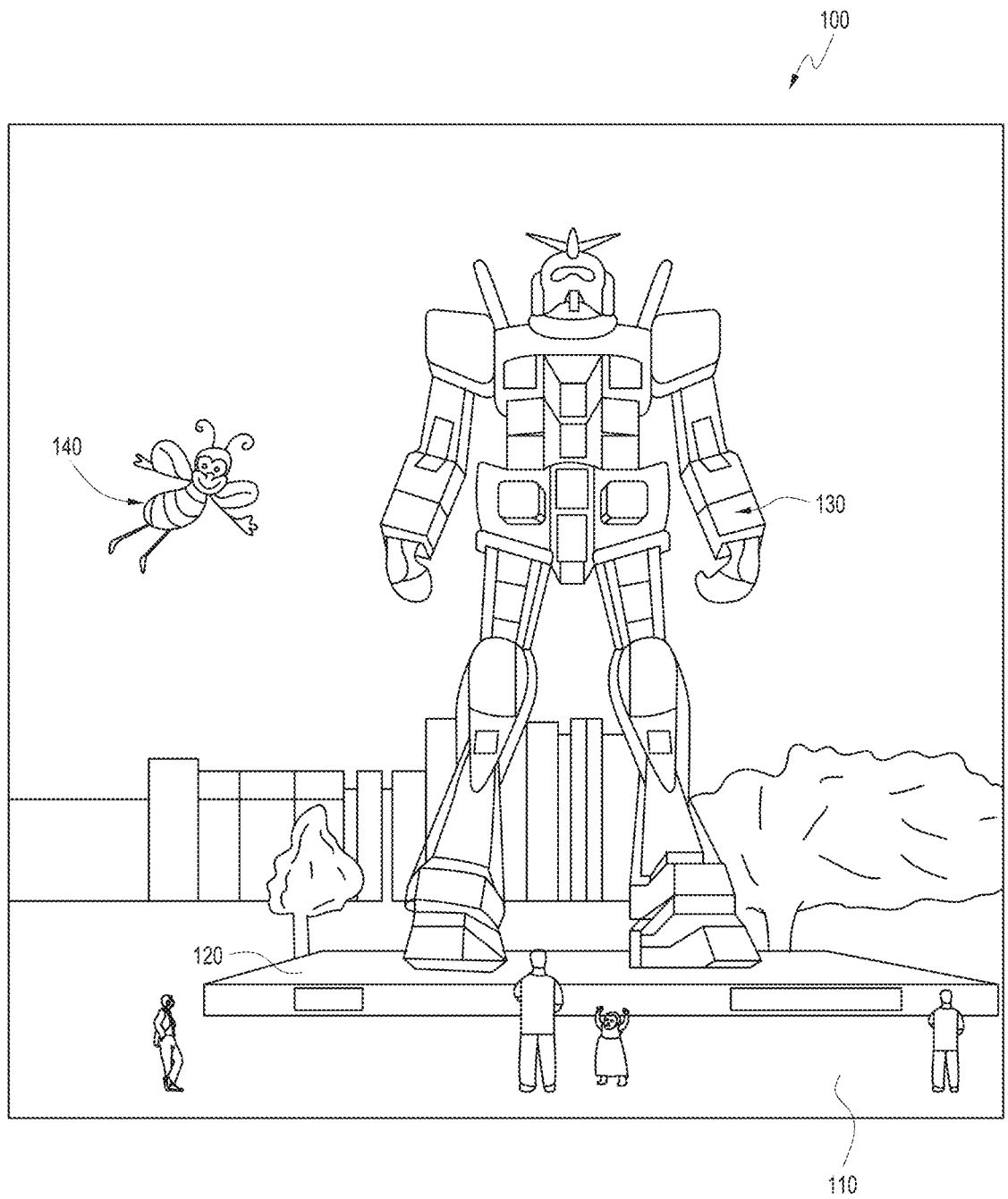
FIG. 1 depicts an illustration of a mixed reality scenario with certain virtual reality objects, and certain physical objects viewed by a person.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
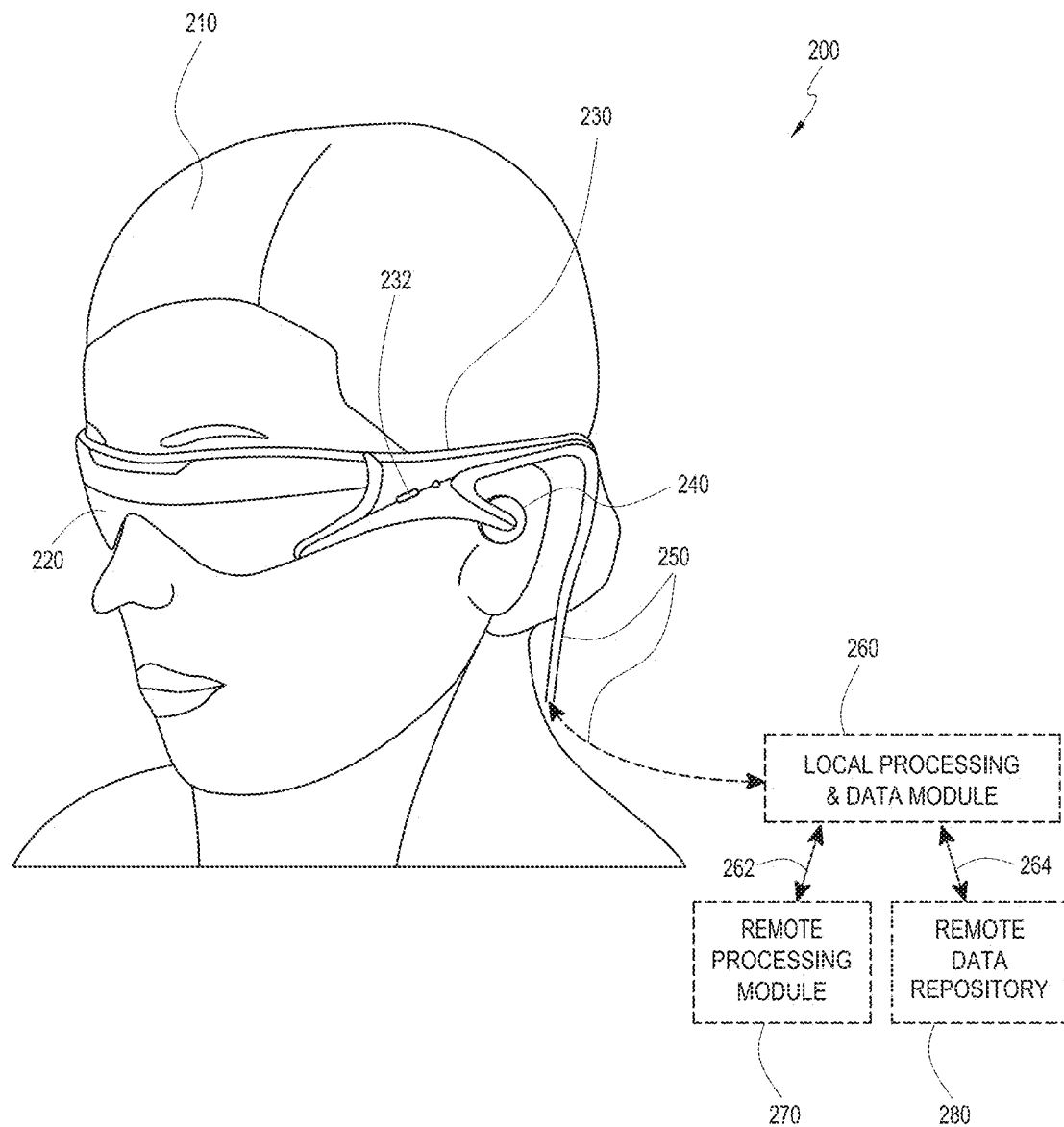
FIG. 2 schematically illustrates an example of a wearable system which can implement an example waypoint system.

FIG. 2 illustrates an example of wearable system 200 which can be configured to provide an AR/VR/MR scene and can include an example waypoint system described herein. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. One or more other audio sensors, not shown, can be positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

The remote processing module 270 can include one or more processors configured to analyze and process data or image information. The remote data repository 280 can include a digital data storage facility, which may be available through the internet or other networking configuration in a "cloud" resource configuration. Data can be stored, and computations can be performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
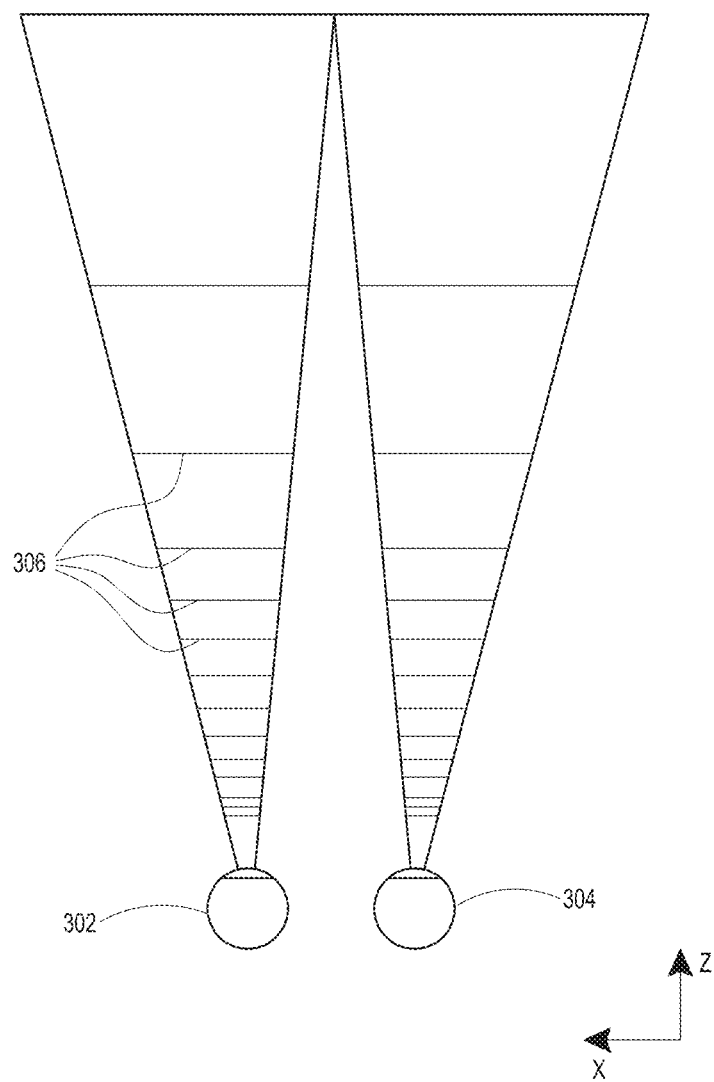
FIG. 3 schematically illustrates aspects of an approach for simulating three-dimensional imagery using multiple depth planes.

FIG. 3 illustrates aspects of an approach for simulating a three-dimensional imagery using multiple depth planes.

With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. Three-dimensional imagery can be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

C. Waveguide Stack Assembly

Figure 4:
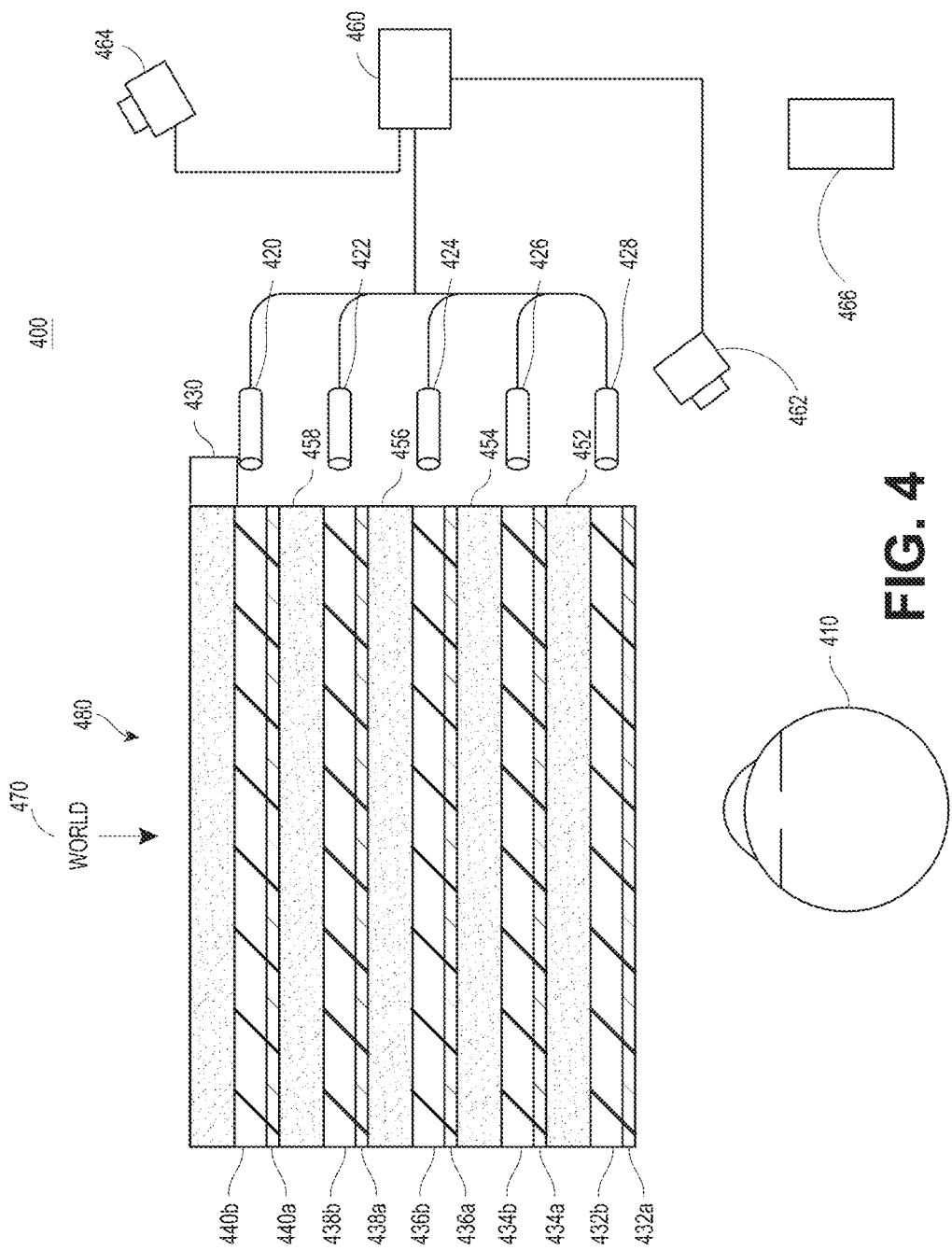
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. The wearable system 400 can correspond to wearable system 200 of FIG. 2, with FIG. 4 schematically showing some parts of that wearable system 200 in greater detail. For example, the waveguide assembly 480 can be integrated into the display 220 of FIG. 2.

With continued reference to FIG. 4, the waveguide assembly 480 may also include a plurality of features 458, 456, 454, 452 between the waveguides. The features 458, 456, 454, 452 may be lenses. The features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. A single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

The image injection devices 420, 422, 424, 426, 428 can be discrete displays that each produce image information for injection into a corresponding waveguide 440b, 438b, 436b, 434b, 432b, respectively. Additionally or alternatively, the image injection devices 420, 422, 424, 426, 428 can be the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 can include programming (e.g., instructions in a non-transitory computer-readable medium) that regulates the timing and provision of image information to the waveguides 440b, 438b, 436b, 434b, 432b. The controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light can be outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity the light extracting optical elements 440a, 438a, 436a, 434a, 432a may be disposed at the top or bottom major surfaces, or may be disposed directly in the volume of the waveguides 440b, 438b, 436b, 434b, 432b. The light extracting optical elements 440a, 438a, 436a, 434a, 432a may be formed in a layer of material that is attached to a transparent substrate to form the waveguides 440b, 438b, 436b, 434b, 432b. The waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b can be configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic, or electro-active). Additionally or alternatively, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. As discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

One or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

The number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

The display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

It may be desirable to have an exit beam meet the condition of having a diameter that is less than the diameter of the eye of a viewer. However, meeting this condition may be challenging in view of the variability in size of the viewer's pupils. This condition may be met over a wide range of pupil sizes by varying the size of the exit beam in response to determinations of the size of the viewer's pupil. For example, as the pupil size decreases, the size of the exit beam may also decrease. The exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size or orientation of the pupil of the eye 304. The inward-facing imaging system 466 can be used to obtain images for use in determining the direction the user is looking (e.g., eye pose) or for biometric identification of the user (e.g., via iris identification). At least one camera may be utilized for each eye, to separately determine the pupil size or eye pose of each eye independently, thereby allowing the presentation of image information to each eye to be dynamically tailored to that eye. The pupil diameter or orientation of only a single eye 410 (e.g., using only a single camera per pair of eyes) can be determined and assumed to be similar for both eyes of the user. The images obtained by the inward-facing imaging system 466 may be analyzed to determine the user's eye pose or mood, which can be used by the wearable system 400 to decide which audio or visual content should be presented to the user. Additionally or alternatively, the wearable system 400 may determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. The user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
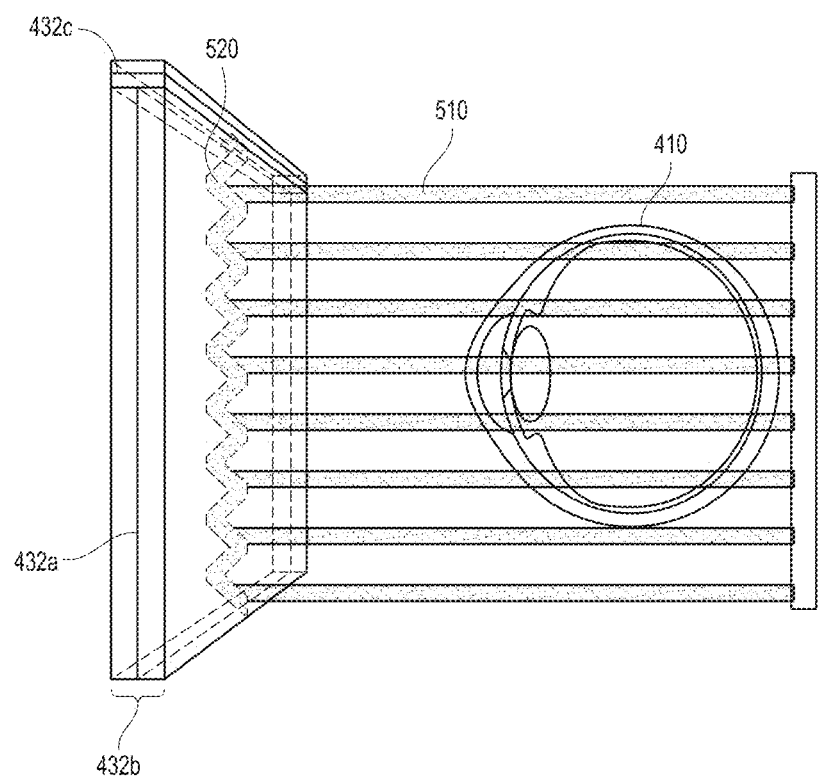
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 can be injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
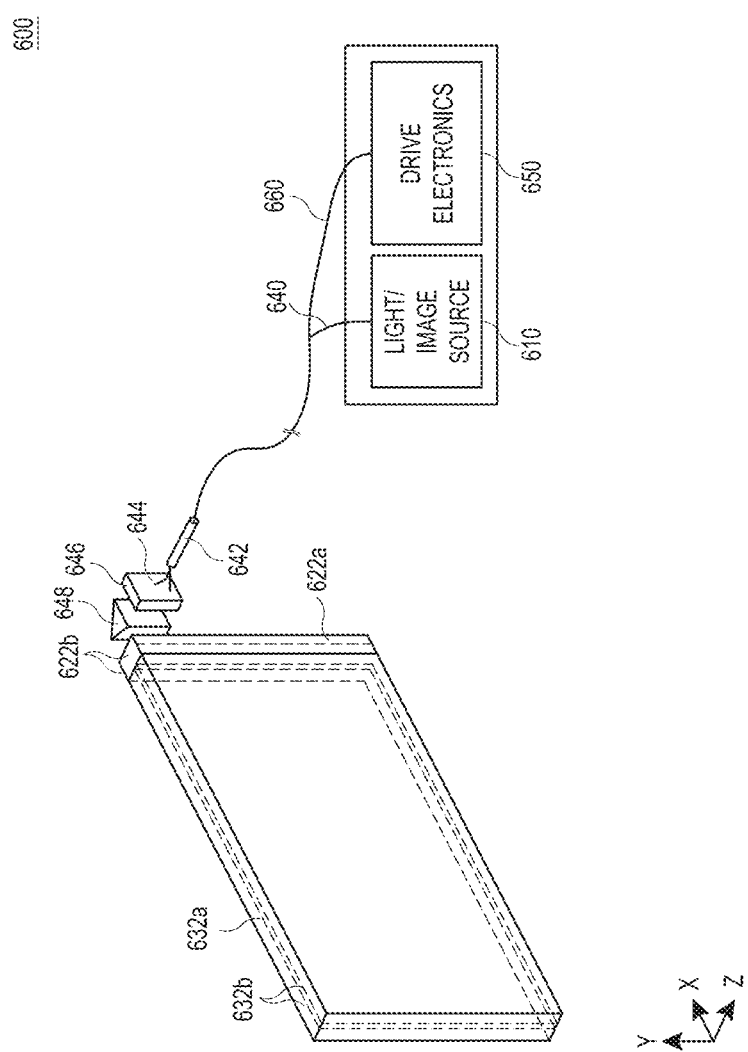
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6) and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively.

Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery, or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR and emerge from the face of the primary waveguide 632b. The radially symmetric diffraction pattern of the DOE 632a additionally can impart a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue, and green light at a first focal depth. A second set of three adjacent layers may be employed to respectively produce red, blue, and green light at a second focal depth. Multiple sets may be employed to generate a full 3D or 4D color image light field with various focal depths.

D. Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

E. Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
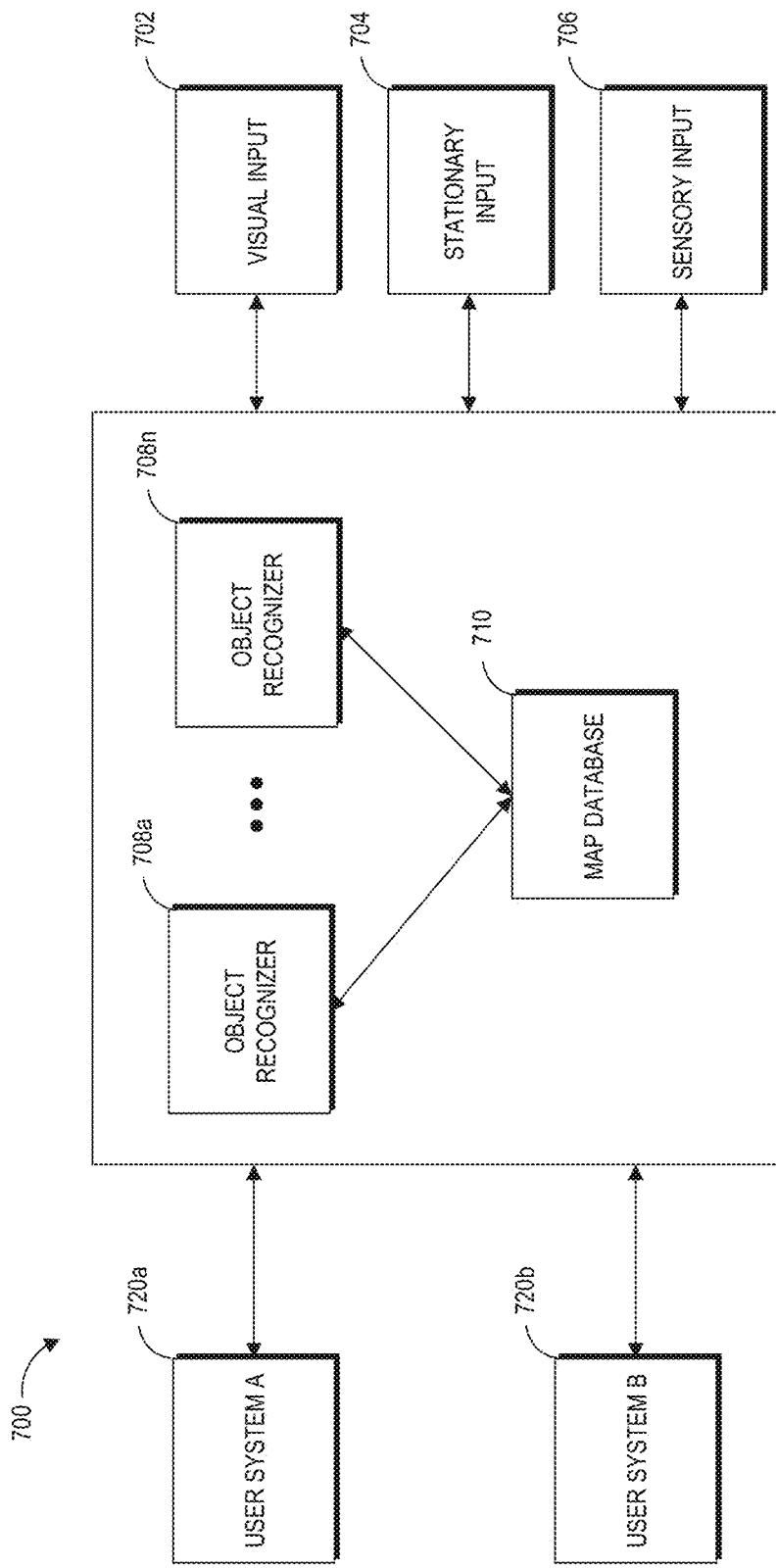
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), or other machine learning algorithms. Individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. The wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
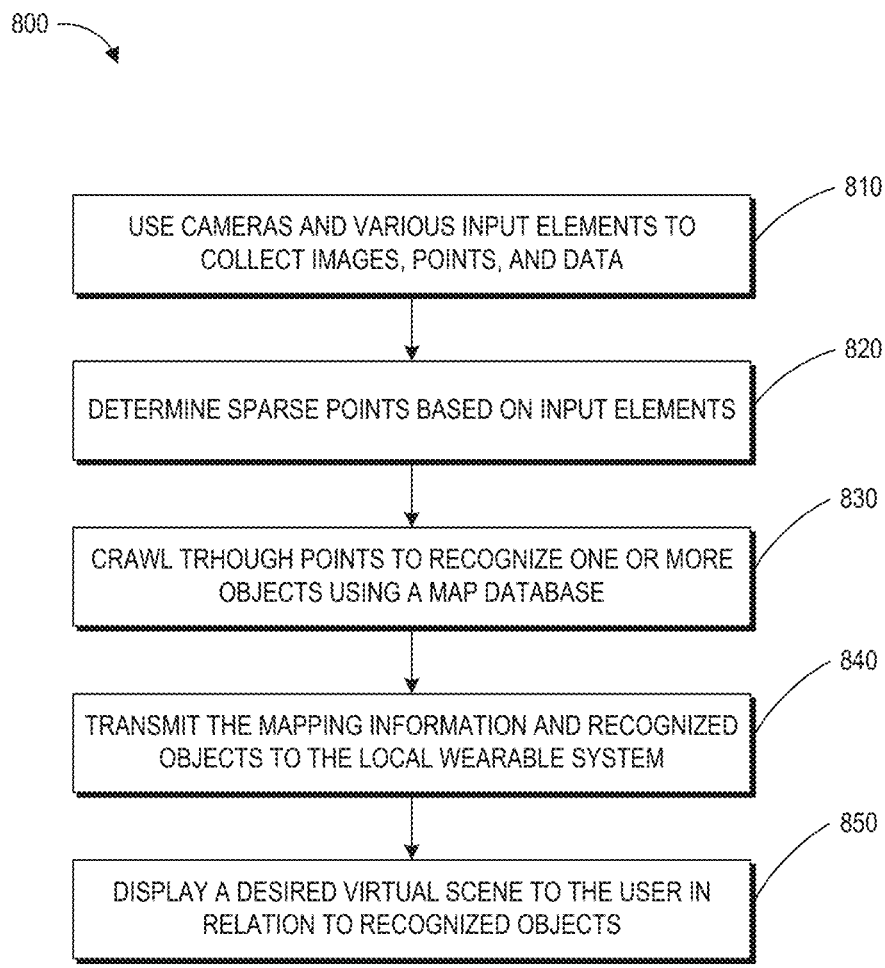
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
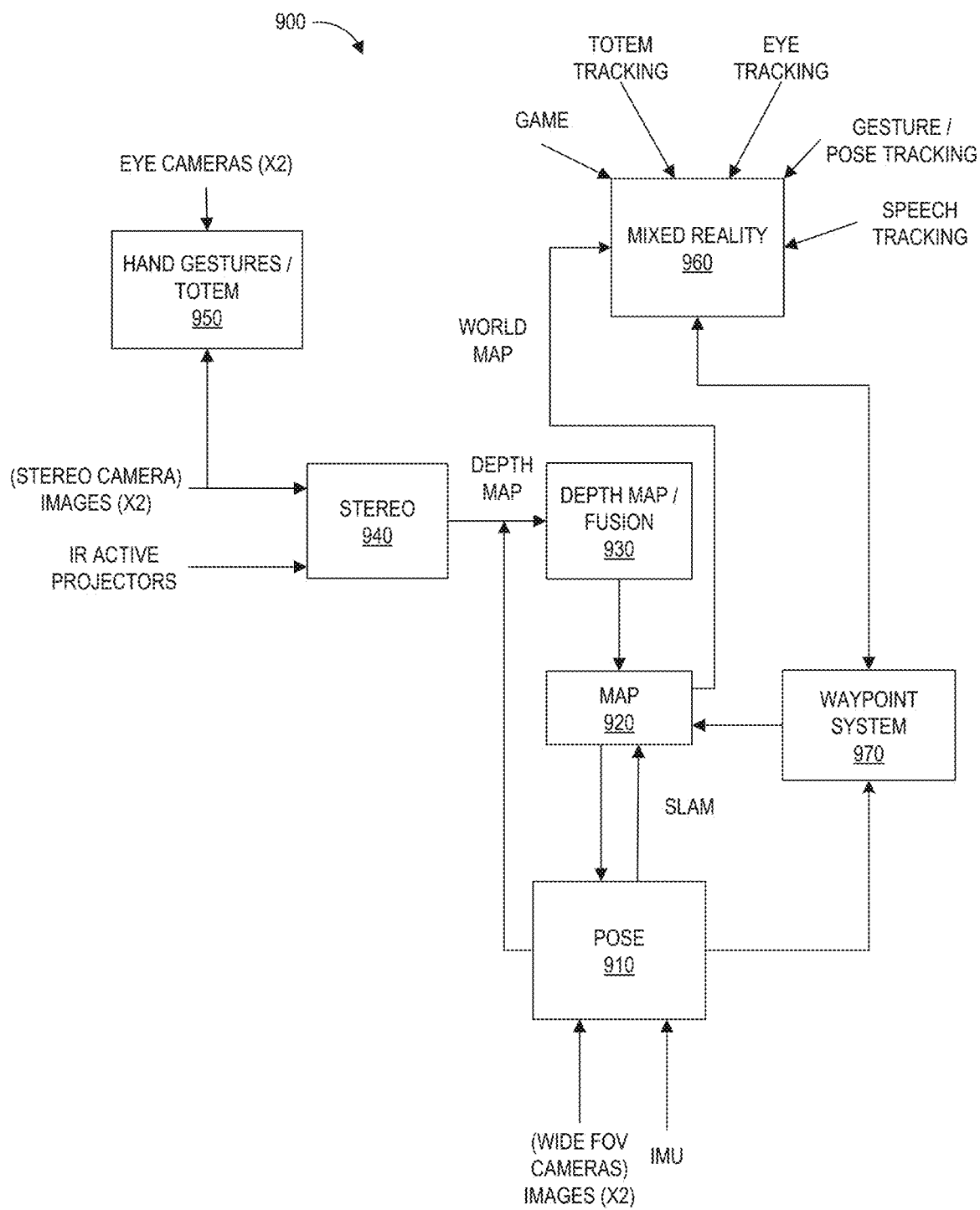
FIG. 9 is a block diagram of another example of a wearable system that includes an example waypoint system.

FIG. 9 is a block diagram of another example of a wearable system. In this example, the wearable system 900 comprises a map 920, which may include the map database 710 containing map data for the world. The map may partly reside locally on the wearable system and may partly reside at networked storage locations accessible by wired or wireless network (e.g., in a cloud system). A pose process 910 may be executed on the wearable computing architecture (e.g., processing module 260 or controller 460) and utilize data from the map 920 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors), images acquired from image cameras, or hand gestures/totem 950 may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 910 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects and the world map can be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. A totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). Vergence of the eyes may be determined using triangulation, and then using a vergence/accommodation model developed for that particular person, accommodation may be determined. The eye camera(s) can perform eye tracking to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 900 can include an audio sensor (e.g., a microphone) that receives an audio stream from the environment. The system 900 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc. In some cases, the speech will come from multiple sources, for example, from another person in the vicinity of the user, from an announcer on a television playing in the vicinity of the person, and from speech content that is being played to the user of the ARD via the speaker 240. As further described below, these different speech sources (e.g., a person, a television announcer, and an audio stream in this example) may be content analyzed and different topics may be presented differently to the user by a user interface of the ARD (e.g., different topics organized into different threads, speech by different speakers organized into different threads, or a combination of these).

The local data & processing module 260 or the remote processing module 270 can also apply voice recognition algorithms which can identify the identity of the speaker, such as whether the speaker is the user 210 of the wearable system 900 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a waypoint mapping system 970 can use these user controls or inputs via a user interface (UI). UI elements (e.g., controls, popup windows, bubbles, data entry fields, etc.) can be used, for example, to dismiss a display of auxiliary information, or to add a word to a common word dictionary. Examples of such implementations of the waypoint mapping system 970 and these uses are described with reference to FIGS. 13-24.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
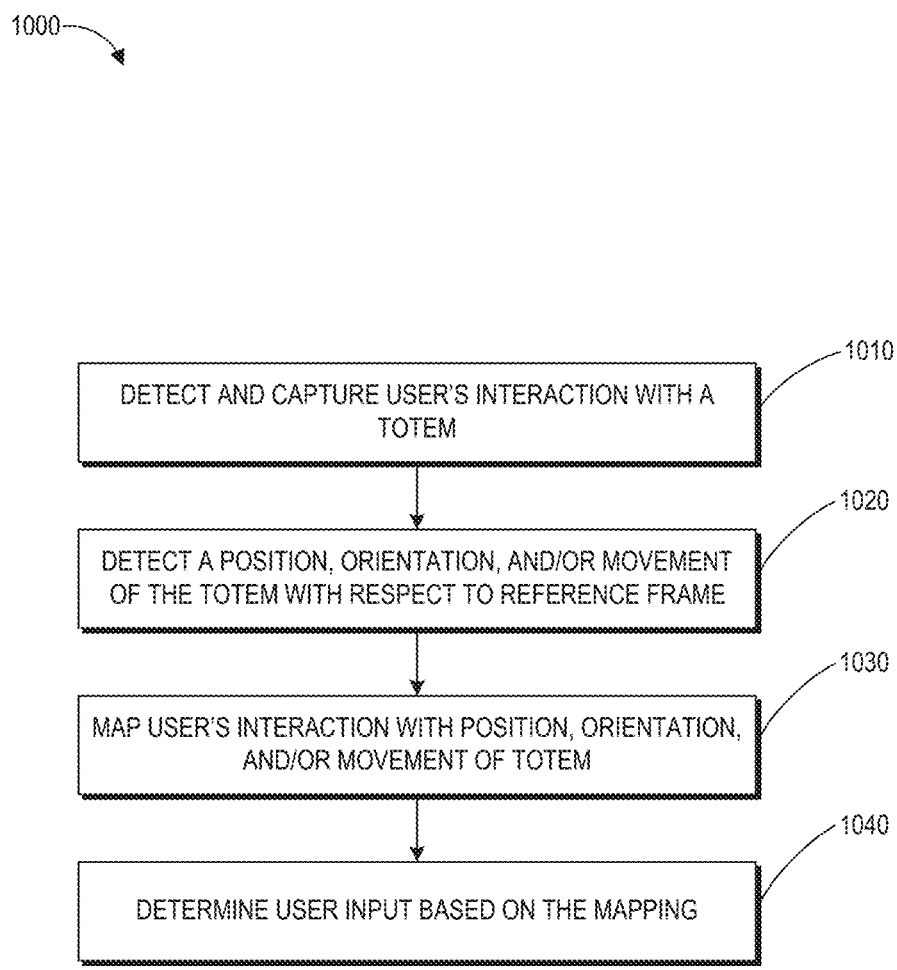
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward-facing imaging system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. The vergence of the user's eyes can be tracked and an accommodation/vergence model can be used to determine the accommodation state of the user's eyes, which provides information on a depth plane on which the user is focusing. The wearable system can use ray casting techniques to determine which real or virtual objects are along the direction of the user's head pose or eye pose. The ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
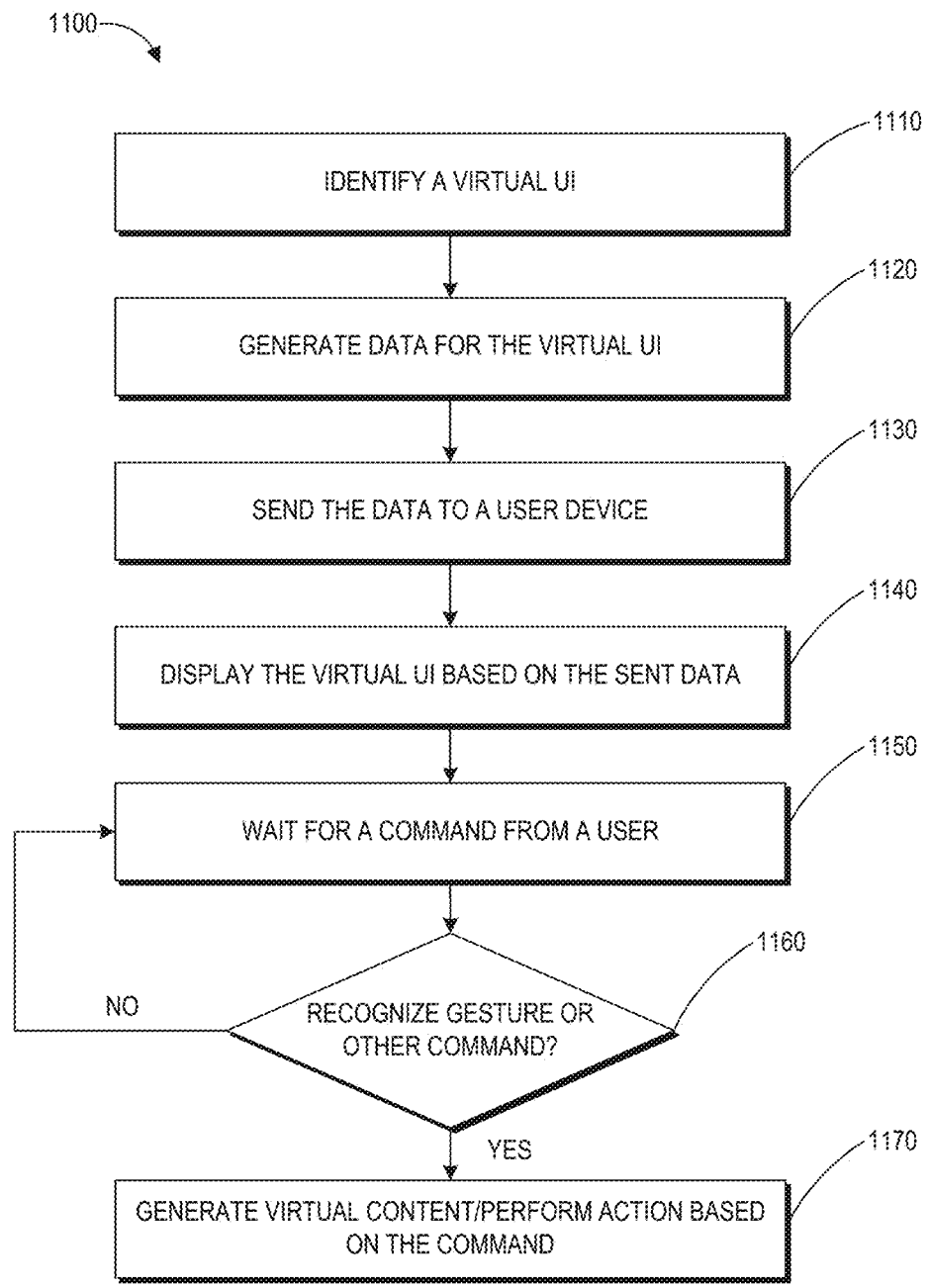
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein. Embodiments of the method 1100 can be used by the wearable system to detect persons or documents in the FOV of the wearable system.

At block 1110, the wearable system may identify a particular UI. The type of UI may be determined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1160), virtual content associated with the command may be displayed to the user (block 1170).

Additional examples of wearable systems, UIs, and user experiences (UX) are described in U.S. Patent Publication No. 2015/0016777, which is incorporated by reference herein in its entirety.

F. Example Communications Among Wearable Systems

Figure 12:
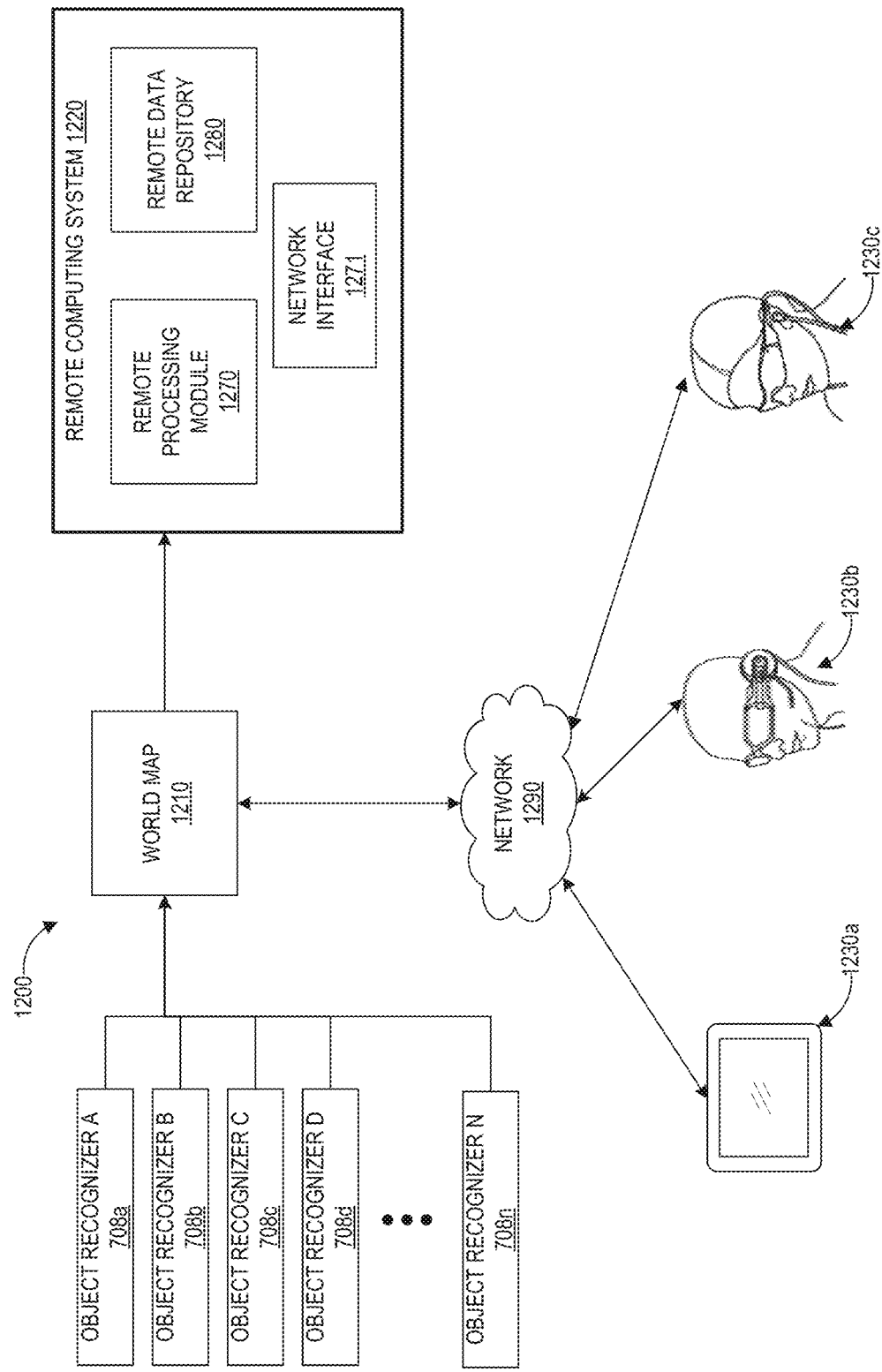
FIG. 12 schematically illustrates an overall system view depicting multiple user devices interacting with each other.

FIG. 12 schematically illustrates an overall system view depicting multiple user devices interacting with each other. The computing environment 1200 includes user devices 1230*a*, 1230*b*, 1230*c*. The user devices 1230*a*, 1230*b*, and 1230*c* can communicate with each other through a network 1290. The user devices 1230*a*-1230*c* can each include a network interface to communicate via the network 1290 with a remote computing system 1220 (which may also include a network interface 1271). The network 1290 may be a LAN, WAN, peer-to-peer network, radio, Bluetooth, or any other network. The computing environment 1200 can also include one or more remote computing systems 1220. The remote computing system 1220 may include server computer systems that are clustered and located at different geographic locations. The user devices 1230*a*, 1230*b*, and 1230*c* may communicate with the remote computing system 1220 via the network 1290.

The remote computing system 1220 may include a remote data repository 1280 which can maintain information about a specific user's physical or virtual worlds. The remote data repository may be an embodiment of the remote data repository 280 shown in FIG. 2. The remote computing system 1220 may also include a remote processing module 1270. The remote processing module 1270 may be an embodiment of the remote processing module 270 shown in FIG. 2. The remote processing module 1270 may include one or more processors which can communicate with the user devices (1230*a*, 1230*b*, 1230*c*) and the remote data repository 1280. The processors can process information obtained from user devices and other sources. At least a portion of the processing or storage can be provided by the local processing and data module 260 (as shown in FIG. 2). The remote computing system 1220 may enable a given user to share information about the specific user's own physical or virtual worlds with another user.

The user device may be a wearable device (such as an HMD or an ARD), a computer, a mobile device, or any other devices alone or in combination. For example, the user devices 1230*b* and 1230*c* may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices or multiple server computer systems may participate in the construction or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 7 and 9, information acquired by the user devices may be used to construct a world map 1210. The world map 1210 may include at least a portion of the map 920 described in FIG. 9. Various object recognizers (e.g. 708a, 708b, 708c . . . 708n) may be used to recognize objects and tag images, as well as to attach semantic information to the objects. These object recognizers are also described in FIG. 7.

The remote data repository 1280 can be used to store data and to facilitate the construction of the world map 1210. The user device can constantly update information about the user's environment and receive information about the world map 1210. The world map 1210 may be created by the user or by someone else. As discussed herein, user devices (e.g. 1230a, 1230b, 1230c) and remote computing system 1220, alone or in combination, may construct or update the world map 1210. For example, a user device may be in communication with the remote processing module 1270 and the remote data repository 1280. The user device may acquire or process information about the user and the user's environment. The remote processing module 1270 may be in communication with the remote data repository 1280 and user devices (e.g. 1230a, 1230b, 1230c) to process information about the user and the user's environment. The remote computing system 1220 can modify the information acquired by the user devices (e.g. 1230a, 1230b, 1230c), such as, e.g. selectively cropping a user's image, modifying the user's background, adding virtual objects to the user's environment, annotating a user's speech with auxiliary information, etc. The remote computing system 1220 can send the processed information to the same or different user devices.

G. Example World Model

An AR system may capture information from a user's environment using one or more sensors (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.) to produce a world model. The world model can effectively act as a map of the user's world (e.g., ambient surroundings, interactions, etc.) for the placement and interaction of virtual objects with the user's perceived physical environment. For example, the world model can include a mesh map of the user's physical environment. The mesh map may include a polygon mesh comprising vertices, edges, and faces that describe shapes of objects. The AR system can then use the mesh map to, for example, determine a topological or geologic map of the user's environment, identify one or more points of stress in the topological or geometric map, determine user movement in relation to the mesh map, recognize physical objects based on the mesh map, or display virtual objects interacting with the physical objects based on recognized properties of the physical object.

The information associated with the world model (e.g. captured images, map points) can be stored locally on a user's AR system 1310 or remotely. For example, the information can be part of a passable world model such that the information associated with the world model can be uploaded to and retrieved from the cloud by any user with authorization to access the world model.

Figure 13A:
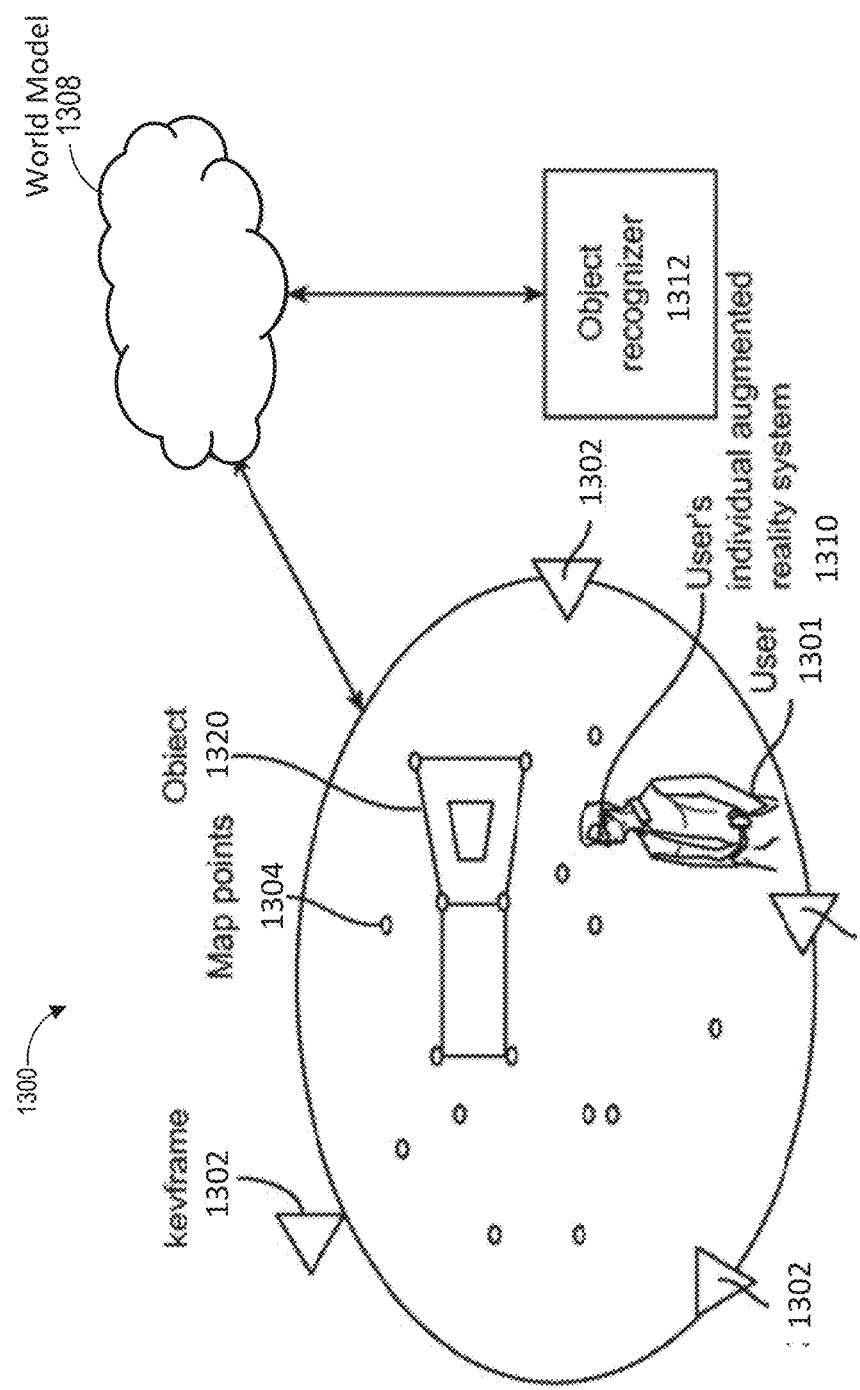
FIG. 13A illustrates an example virtual environment having a plurality of map points detected from a plurality of keyframes.

FIG. 13A illustrates an exemplary virtual environment 1300 for which a world model can be generated. For example, a user 1301 wearing a wearable device of an augmented reality (AR) system 1310 may walk through a physical environment. One or more sensors associated with the AR system 1310 can capture information associated with the physical environment using one or more sensors, such as an outward facing camera, depth sensor, audio sensor, environmental sensor, temperature sensor, humidity sensor, a sensor not on a wearable system (such as a room mounted sensor), a space-based sensor, some combination thereof or the like. Additionally or alternatively, the AR system 1310 can access information associated with the physical environment previously captured or processed. For example, the captured information can include data about the user's pose, data about the user's physical environment, such as signed distance field values for generating a mesh map of the user's physical environment or pre-determined digital map(s) of the user's physical environment. The AR system 1310 can process the information to determine a plurality of map points 1304, such as sparse points, that may be representative of the user's physical environment. In the illustrated embodiment, an image may be taken of the object 1320 (which resembles a table) and map points 1304 may be collected based on the captured image. This forms the core of the world model, as shown by multiple keyframes (e.g., cameras) 1302 that have captured information about the environment.

Map points 1304 can be collected through keyframes 1302. A keyframe 1302 can include a position and orientation of a camera or other sensor capable of collecting information relating to the physical environment of the user 1301. As shown in FIG. 13A, there may be multiple keyframes 1302 that capture information about a space at any given point in time. For example, a keyframe may be another user's AR system capturing information from a particular point of view. Another keyframe may be a room-based camera/sensor system that is capturing images and points 1304 through a stationary point of view. By triangulating images and points from multiple points of view, the position and orientation of real objects in a 3D space may be determined.

The AR system 1310 can capture information by a keyframe 1302 associated with one or more sensors associated with the AR system 1310. For example, the AR system 1310 can capture information (e.g., images, location information, position, and orientation information, etc.) relating to the physical environment using an outward facing camera on a user's wearable AR device. Additionally or alternatively, keyframes 1302 can include cameras from other user devices, such as mobile devices, web cams, another AR system, some combination thereof or the like.

FIG. 13A illustrates an exemplary virtual environment 1300 for user 1301 to observe through augmented reality display system 1310. As illustrated in FIG. 13A, the physical environment user 1301 in which the user is located may be represented by a plurality of map points 1304, such as sparse points collected by a plurality of keyframes 1302. In some embodiments, augmented reality display system 1310 may process a plurality of map points to identify surfaces or specific objects 1320 within the physical environment. The more map points 1304 the augmented reality display system 1310 observes, the more recognition and inferences about the physical environment are possible.

The plurality of map points 1304 can be processed by the AR system 1310 to identify surfaces or specific objects 1313 within the physical environment. For example, an image may be taken by one or more sensors associated with the AR system 1310 of an object 1313 (e.g., a table). The AR system 1310 may reduce the image to a set of map points 1304. The map points 1304 may then be analyzed based on the captured image to identify a surface of the object 1320. For example, object recognizers 1312 (e.g., the object recognizers 708) may recognize objects in the environment based on the map points 1304 and pose-tagged images captured through the keyframes. The object recognizers 1312 may be on the cloud or on the user's individual system 1310.

The AR system 1310 can generate a world model 1308 using the identified surfaces or specific objects 1320 within the physical environment. The world model 1308 can be a combination of raster imagery, point and descriptors clouds, and polygonal/geometric definitions (referred to herein as parametric geometry).

The AR system 1310 may generate the world model by demand, at startup of an application, or at a suitable interval. Additionally or alternatively, the AR system 1310 may update an already generated world model. For example, the AR system 1310 can periodically capture information about the physical environment of the user 1301 through one or more keyframes 1302. The AR system 1310 can grow an existing world model based on the continually captured information. The AR system 1310 may consult the existing world model (continuously or as needed) in order to determine how to render virtual content in relation to existing physical objects of the real world. Advantageously, this constructed and augmented world model may be "passed" along to one or more AR users simultaneously or in the future.

Asynchronous communications can be established between multiple user's respective individual AR systems and cloud based computers (e.g., server computers or remote processing modules 270). In other words, the user's individual AR system can constantly update information about the user's surroundings to the cloud and receiving information from the cloud about the passable world. Thus, rather than each AR user having to capture images and recognize objects based on the captured images, having an asynchronous system allows the system to be more efficient. Information that already exists about that part of the world is automatically communicated to the individual AR system while new information is updated to the cloud. It should be appreciated that the world model lives both on the cloud or other form of networking computing or peer to peer system and may live on the user's individual AR system.

In one or more embodiments, the AR system may employ different levels of resolutions for the local components (e.g., local data processing module 260) and remote components (e.g., remote processing module 270). This is because the remote components (e.g., resources that reside on the cloud servers) are typically more computationally powerful than local components. The cloud based computers may pick data collected by the many different individual AR systems, and/or one or more space or room based sensor systems and utilize this information to add on to the world model. The cloud based computers may aggregate only the best (e.g., most useful) information into a persistent world model. In other words, redundant information and/or less-than-optimal quality information may be timely disposed so as not to deteriorate the quality and/or performance of the system.

Figure 13B:
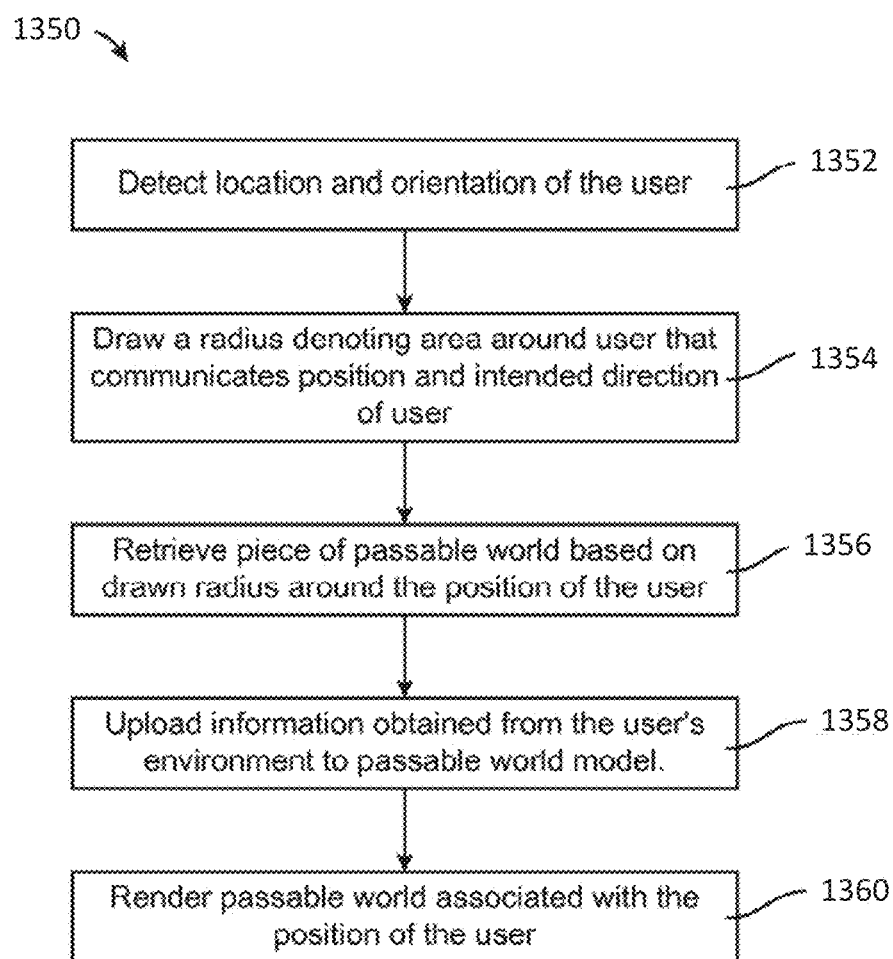
FIG. 13B illustrates an example method of rendering using the world model.

FIG. 13B illustrates an example method 1350 of interacting with the world model. At 1352, the user's individual AR system may detect a location and orientation of the user within the world. In one or more embodiments, the AR system may derive the location based on a topological map of the system. In other embodiments, the AR system may derive the location based on GPS or any other localization tool. It should be appreciated that the passable world may be constantly accessed by the individual AR system.

In another embodiment (not shown), the user may request access to another user's space, prompting the system to access that section of the passable world, and associated parametric information corresponding to the other user. Thus, there may be many triggers for the passable world. At the simplest level, however, it should be appreciated that the passable world is constantly being updated and accessed by multiple user systems, thereby constantly adding, and receiving information from the cloud.

Following the above example, based on the known location of the user, at 1354, the system may draw a radius denoting a physical area around the user that communicates both the position and intended direction of the user. Next, at 1356, the system may retrieve a piece of the passable world based on the anticipated position of the user. In one or more embodiments, the piece of the passable world may contain information from the geometric map of the space acquired through previous keyframes and captured images and data stored in the cloud. At 1358, the AR system uploads information from the user's environment into the world model. At 1360, based on the uploaded information, the AR system renders the passable world associated with the position of the user to the user's individual AR system.

This information enables virtual content to meaningfully interact with the user's real surroundings in a coherent manner. For example, a virtual "monster" may be rendered to be originating from a particular building of the real world. Or, in another example, a user may leave a virtual object in relation to physical coordinates of the real world such that a friend (also wearing the AR system) finds the virtual object in the same physical coordinates. In order to enable such capabilities (and many more), it can be advantageous for the AR system to constantly access the passable world to retrieve and upload information. It should be appreciated that the passable world contains persistent digital representations of real spaces that is utilized in rendering virtual and/or digital content in relation to real coordinates of a physical space. It should be appreciated that the AR system may maintain coordinates of the real world and/or virtual world. In some embodiments, a third party may maintain the map (e.g., coordinates) of the real world, and the AR system may consult the map to determine one or more parameters in order to render virtual content in relation to real objects of the world.

It should be appreciated that the world model does not itself render content that is displayed to the user. Rather it is a high level concept of dynamically retrieving and updating a persistent digital representation of the real world in the cloud. In one or more embodiments, the derived geometric information is loaded onto a game engine, which then renders content associated with the passable world. Thus, regardless of whether the user is in a particular space or not, that particular space has a digital representation in the cloud that can be accessed by any user. This piece of the passable world may contain information about the physical geometry of the space and imagery of the space, information about various avatars that are occupying the space, information about virtual objects and other miscellaneous information.

One or more object recognizers may examine or "crawl" the world models, tagging points that belong to parametric geometry. Parametric geometry, points and descriptors may be packaged into world models, to allow low latency passing or communicating of information corresponding to a portion of a physical world or environment. In one or more embodiments, the AR system can implement a two tier structure, in which the world model allows fast pose processing in a first tier, but then inside that framework is a second tier (e.g., FAST features). In one or more embodiments, the second tier structure can increase resolution by performing a frame-to-frame based three-dimensional (3D) feature mapping.

Figure 14:
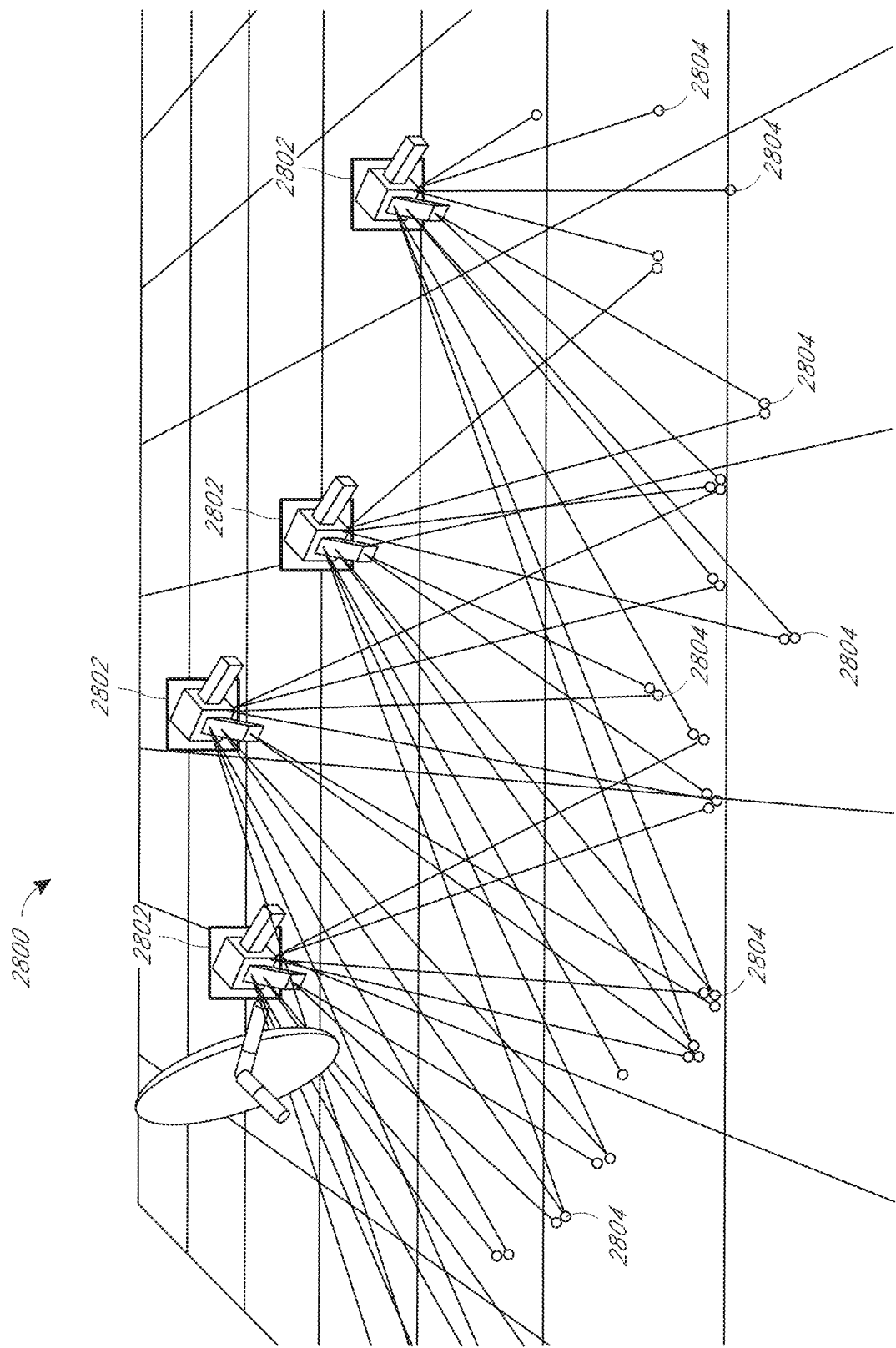
FIG. 14 illustrates an example relationship of sparse points to keyframe positions.

FIG. 14 illustrates a rich map point environment 2800 having map points 2804 captured by a plurality of keyframes 2802. The keyframes 2802 can include positions for capturing map points 2804. Each keyframe 2802 may observe a certain number of map points 2804 less than the full number of potential map points associated with a user's physical environment. Limiting factors for observing map points 2804 include but are not limited to orientation of the keyframe, occlusion of a map point by an interfering object, or system limitations such as sensor distance capabilities underlying the keyframe or any combination of the foregoing or the like. It will be appreciated that as more keyframes 2802 observe the physical environment and the map points disposed within, the greater number of map points 2804 can be collected and used by the augmented reality display system to build a digital re-creation of the physical environment that may be part of a world model, such as a mesh map, on which to place and control virtual content for realistic interactions.

Figure 15A:
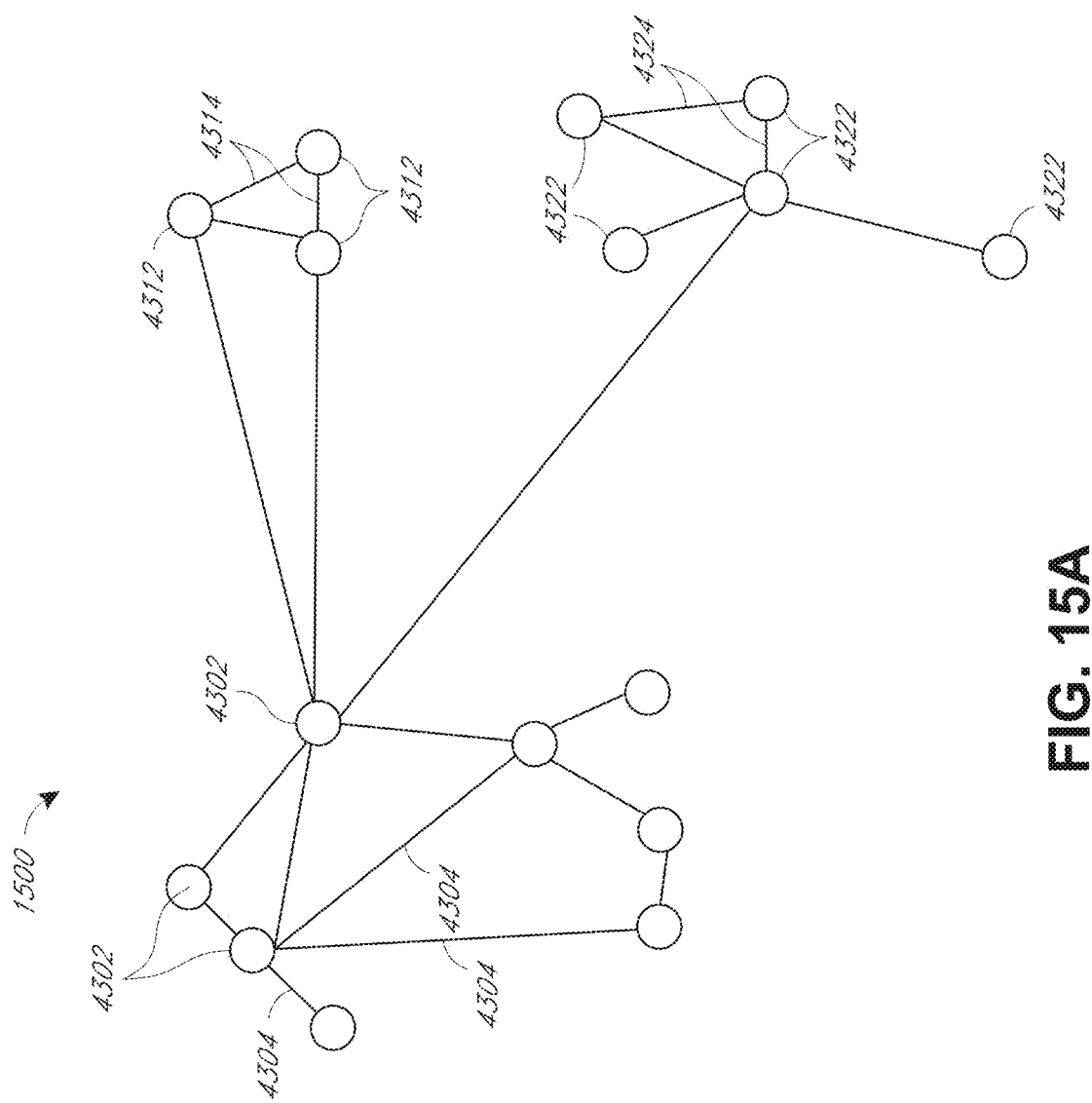
FIG. 15A illustrates an exemplary map potential data points representing an example physical environment.

FIG. 15A illustrates a plurality 1500 of eligible map points in clusters 4302, 4312, and 4322. Clusters may be connected to other clusters or map points within the clusters may be linked by segments 4304, 4314, and 4324. The number of map points and clusters and segments is proportional to the richness and utility of a resulting map. For example, the higher the intersection of the segments at a particular cluster or map point, the higher the likelihood is that there is a map point corresponding to a particular feature in the physical environment.

Figure 15B:
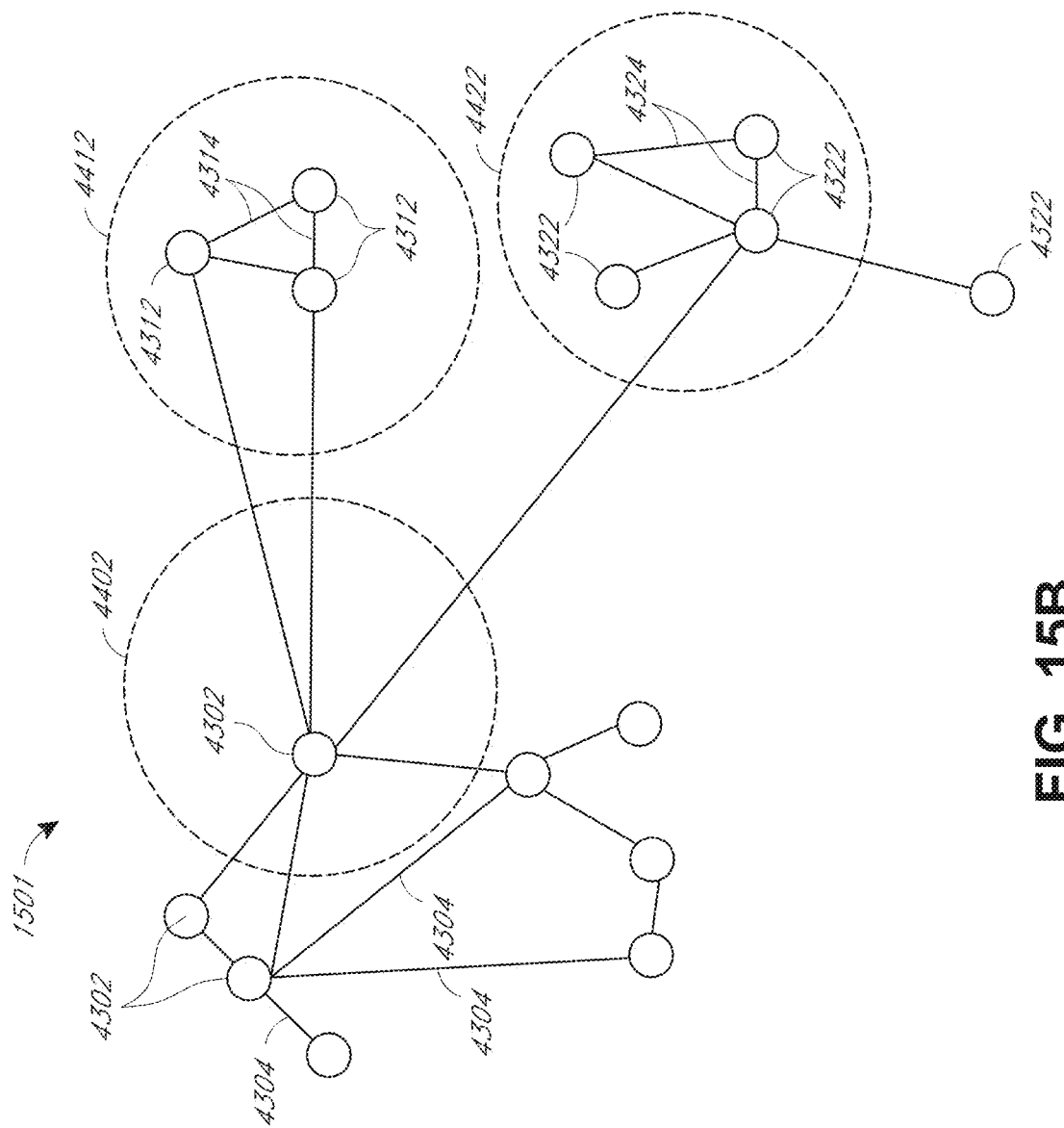
FIG. 15B illustrates an example capture of a subset of the data points representing an example physical environment.
Figure 15C:
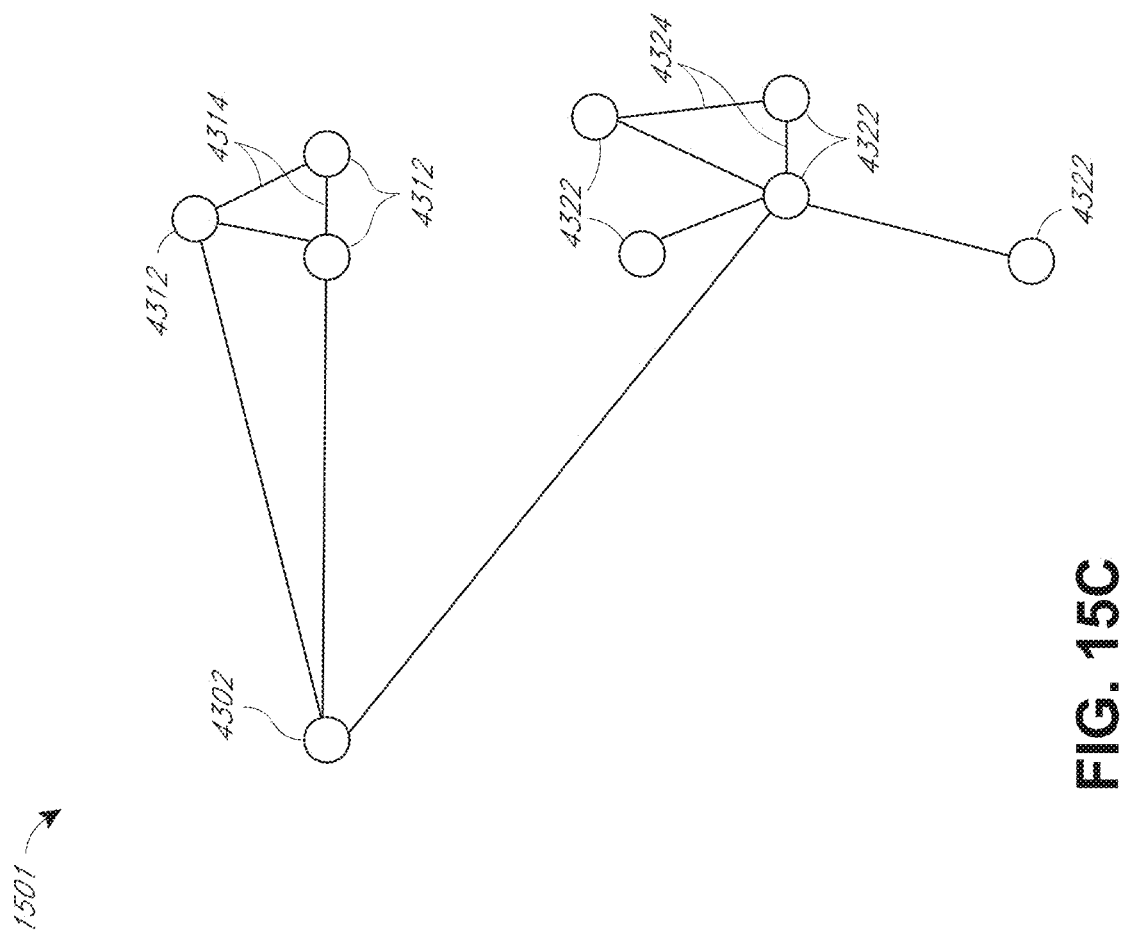
FIG. 15C illustrates an example map comprising example captured data points that are fewer than all potential data points representing an example physical environment.

As illustrated by FIG. 15B, keyframes may not capture every possible map point. For example, a subset 1501 of map points captured by keyframes are shown within dashed circles to correspond to the map points captured by keyframes 4402, 4412 and 4422. FIG. 15C illustrates the resultant map points of the subset 1501. A comparison of the plurality 1500 of eligible map points in FIG. 15A and the subset 1501 of captured map points illustrates the problems of incomplete capture. An augmented reality system may not identify that it is in the physical environment represented by plurality 1500 due to incomplete capture of map points, e.g., the system may produce a false negative. Additionally or alternatively, the augmented reality system may make the wrong conclusions about the physical environment, such as inferring planar surfaces that do not exist, or creating a map with improper geometries. In all, a poor capture by the keyframes of the map points within the physical environment may lead to degraded quality in digital reconstruction of that physical environment.

H. Waypoint Overview

Figure 16A:
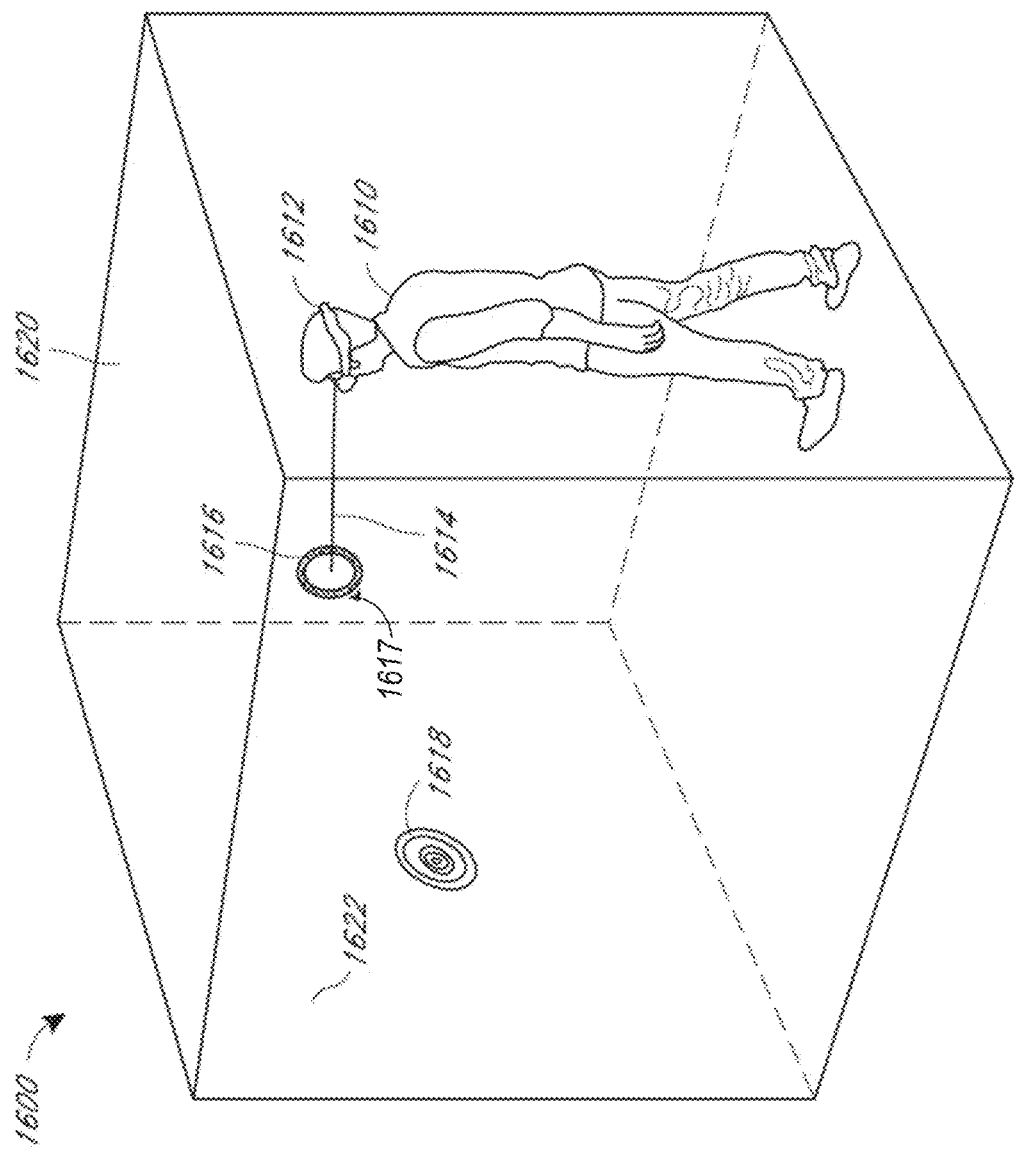
FIG. 16A illustrates an example 3D region with at least one example waypoint.
Figure 16B:
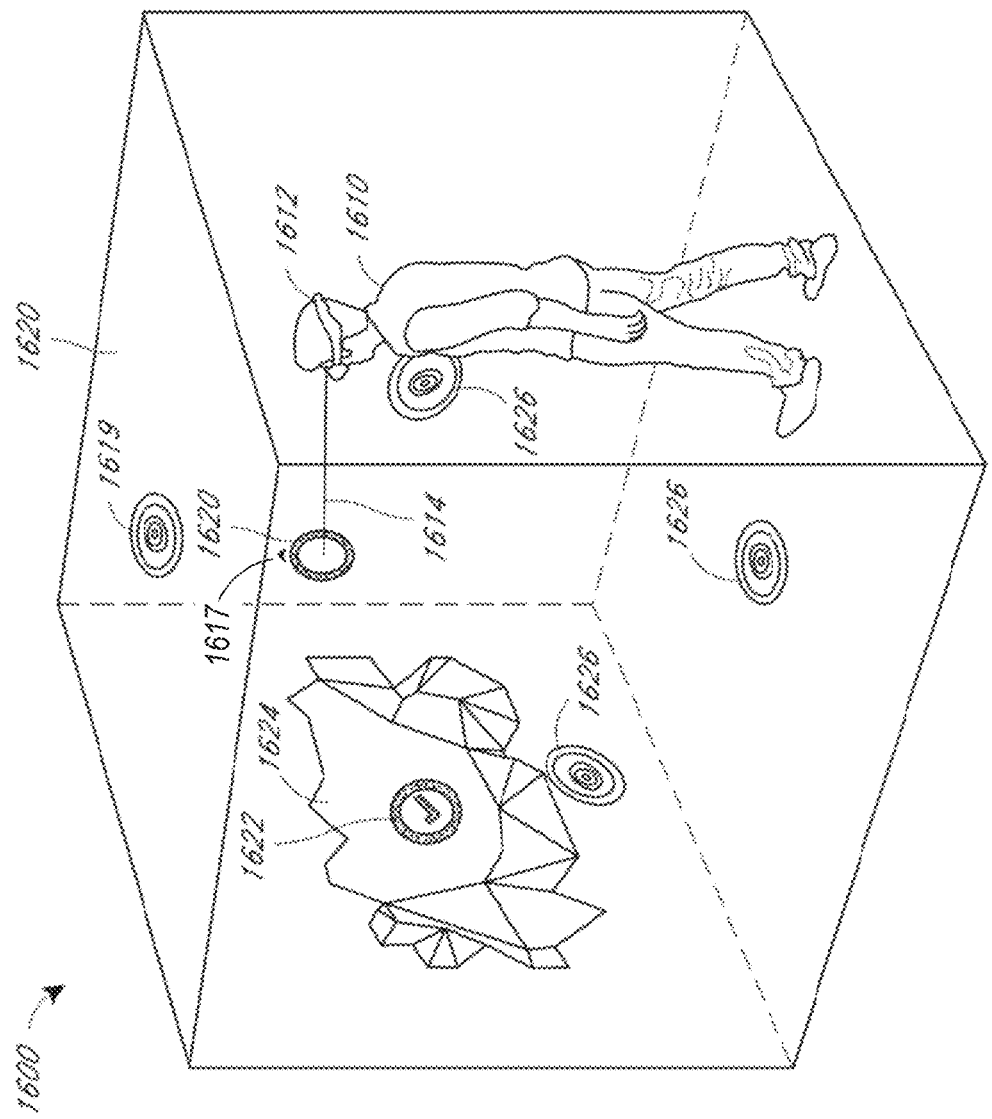
FIG. 16B illustrates an example 3D region having at least one example waypoint in an example sequential observation.

FIGS. 16A-16B illustrate example MR environments 1600 for generating a mesh map that may be used as part of a world model or digital reconstruction of a user's physical environment. For example, as shown in FIG. 16A, to promote fuller capture of map points from a variety of keyframes, an AR system 1612 can virtually project a virtual bounding box 1620 so that it appears (to the user) to be around the user 1610. The AR system 1612 can project at least one waypoint 1618 onto a surface 1622 of the bounding box 1620 for the user 1618 to observe visually while complementary sensors on an AR system 1612 capture data in the direction of the user's observation 1614 towards the waypoint. The user's observation direction 1614 can correspond to a forward orientation of an outward facing camera associated with the AR system.

The AR system 1612 can create the bounding box 1620 around the user 1610 and can, but need not, display the bounding box 1620 to the user. The bounding box 1620 may have any number of geometries. For example, the bounding box 1620 can be a cuboid, polyhedron, ellipsoid (e.g., sphere, oblate spheroid, prolate spheroid), or any other geometric shape. The bounding box 1620 can be any number of sizes. For example, the bounding box 1620 can be large enough to encapsulate the user at startup of the AR display system 1612. In another example, the bounding box 1620 can be large enough to encompass a detected physical environment of the user 1610.

The AR system 1612 can display the waypoint 1618 to the user on or near a virtual surface 1622 of the bounding box 1620. In some embodiments, the user 1610 can observe the waypoint 1612 through a guidance mechanism, such as virtual reticle 1616 disposed between the user and the waypoint. The virtual reticle 1616 can also be referred to as a guidance visual. The virtual reticle 1616 can act as a guide to direct the user 1610 to look at the waypoint 1618. For example, the virtual reticle 1616 can include a guiding graphic (e.g., an arrow 1617) to inform the user where the waypoint is located relative to the user's observation direction 1614. When the user 1610 approximately aligns the virtual reticle 1616 with the waypoint 1618, the AR system 1612 can perform a capture of data (e.g., a keyframe capture) for the physical environment in the direction of the user 1610 observing the waypoint 1618.

As depicted in FIG. 16B, upon capture of data from the portion of the user's physical environment that lies in the direction of the user's 1610 observation of the waypoint 1618, the bounding box can expand to encapsulate map points or depth data (also referred to as a real world collision) associated with the observed portion of the user's physical environment. Optionally, the AR system can project a success graphic 1622 (e.g., a checkmark symbol) in place of the waypoint 1618 upon successful keyframe capture. In the event of a partially or completely unsuccessful keyframe capture, the AR system 1612 can inform the user of a failure to mesh (e.g., via an unsuccessful graph such as a thumbs-down symbol). Additionally or alternatively, the AR system 1612 can project a graphical representation 1624 of successfully mapped points (for example, in the form of a mesh 1624).

The AR system 1612 can also cause projection of a second waypoint 1619 on a virtual surface of the bounding box 1620 to be viewed through a virtual reticle 1616. The AR system 1612 can repeat this sequence to perform a capture of data (e.g., a keyframe capture) at other waypoints 1626. In some embodiments, this sequential observation can occur for a plurality of waypoints to provide a rich keyframe capture of potential map points. The sequential observation can occur for 2, 4, 6, 8, 12, 16 or more waypoints or any suitable number of waypoints.

The waypoints 1618, 1619, 1626 can be determined for placement on any number of virtual surfaces of a bounding box 1620. The user can be guided through a sequential observation of each waypoint 1618, 1619, 1626 in a sequence by the augmented reality display system 1612 according to any suitable criteria. For example, the AR system 1612 can guide the user through sequential observation based on which waypoint position is closest to a display screen center of the augmented reality display device 1612 or based on user gaze direction, as described with reference to FIG. 17 below. In some embodiments, locations of one or more of the waypoints may be predetermined for use in the sequence, for example, locations at center positions of six faces of a bounding cube around the user.

I. Sequential Observation

Figure 17:
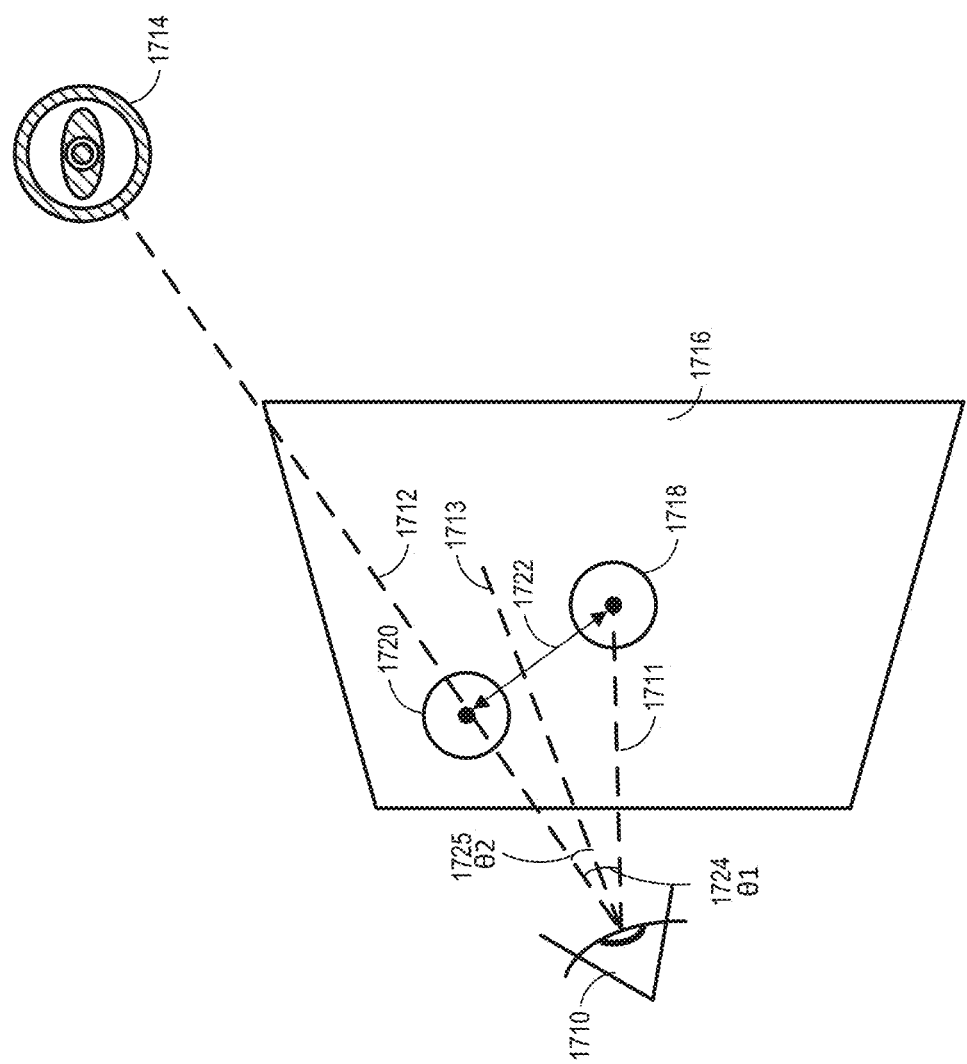
FIG. 17 illustrates an example projection of an example waypoint on a screen relative to a screen center.

FIG. 17 illustrates an example determination of a waypoint during a sequential observation. For example, a display screen 1716 can include a center point 1718. The AR system 1612 can render one or more waypoints to appear at locations on a bounding box (not shown) surrounding the user (for example, bounding box 1620 as shown in FIGS. 16A-B). For example, a waypoint 1714 can appear on the display screen 1716 at a location 1720. The AR system may guide the user's observation of the physical environment using the waypoint location 1720. For example, the AR system may render six waypoints on a cuboid bounding box, e.g., one waypoint on each of the six surfaces of the cuboid. The AR system may determine the nearest unmeshed waypoint for each of the six waypoints. The AR system may guide the user to observe a first unmeshed waypoint at a location 1720 of the six waypoints. In some embodiments, upon a successful mesh or collection of data, the AR system may determine a second unmeshed waypoint and guide the user to the second unmeshed waypoint. The AR system may continue this process until a completion criterion is met. For example, the completion criterion can include that all waypoint locations have been completed or attempted, that a 3D region is meshed to a threshold percentage of completion, or a determination that a 3D region cannot be meshed (e.g., due to insufficient data).

The AR system can guide the user to look towards the waypoint 1714 based on the waypoint's location 1720 on the display screen 1716. For example, in a polar coordinate system, the location 1720 can be an angle θ1 1724 away from the center point 1718. In another example, in Euclidean coordinates, the location 1720 can be a distance 1722 away from the center point 1718. The guidance can determine the nearest waypoint 1714 by determining the smallest angle θ1 1724 or distance 1722 from the center point 1718 to the waypoint location 1720 on the display screen 1716. The AR system can then guide the user to observe the nearest waypoint 1714.

The display screen 1716 can be part of an AR device. For example, the AR device can be an HMD (e.g., the system 200 described with reference to FIG. 2) or mobile device (e.g., cellular telephone or tablet display). The center point 1718 can be a physical center of the display screen 1716. For example, the display screen 1716 can be a mobile device with a viewing screen. The center point 1718 can be the physical center of the viewing screen. In another example, the display screen 1716 can be part of an HMD. The HMD can have one or more display screens 1716. For example, the HMD can have a display screen 1716 for each of the user's eyes 1710. The center point 1718 can be a physical center of an HMD display screen associated with each of the user's eyes 1710.

Additionally or alternatively, the center point 1718 can be a center of the display screen 1716 relative to a user's eye 1710. For example, the center point 1718 can be defined according to the user's center gaze while wearing an HMD containing the display screen 1716. The center point 1718 can be determined during a calibration process. For example, the center point 1718 can be determined when the user puts the HMD on or be adjusted according to the position of the HMD on the user's head.

Additionally or alternatively, the center point 1718 can be a fixed location in the user's 3D space. For example, the center point 1718 can be a location associated with a user's forward or center gaze. In another example, the center point 1718 can be a location associated with the user's facing direction. The user's facing direction can be determined by the user's pose, such as the user's hand location or head orientation. In another example, the center point 1718 can be a location associated with the AR system's facing direction. The location of the center point 1718 can remain fixed relative to the user's physical environment and move or disappear on the display screen 1716 as the user moves the display screen 1716 within the user's physical environment.

Additionally or alternatively, the location of the center point 1718 can be a location associated with a surface of a 3D region surrounding the user. For example, the AR system can virtually project a cuboid bounding box around the user. The center point 1718 can be a location on a surface of the bounding box. Additionally or alternatively, the center point 1718 can be determined based on any combination of gaze direction, physical center of the display screen 1716, relative center of the display 1716, AR system facing direction, location on a 3D region surrounding the user or the like.

One or more waypoints 1714 may be rendered or virtually projected by the AR system onto a region of 3D space surrounding the user. For example, the AR system may render six waypoints on a cuboid bounding box, one waypoint for each surface of the cuboid. The waypoints 1714 can have different locations relative to the user or the center point 1718. For example, as illustrated in FIG. 17, a waypoint 1714 can have a location 1720 on a display screen 1716 relative to a center point 1718.

The location 1720 can be defined in any suitable coordinate system. For example, the location 1720 can be defined according to a polar or spherical coordinate system having a polar axis 1711. The polar axis 1711 can be associated with a gaze direction towards the center point 1718 from the user's eye 1710. Additionally or alternatively, the polar axis 1711 can be associated with any suitable point, location, or direction in the user's physical environment or on the display screen 1716. The location 1720 can be a polar or azimuthal angle θ1 1724 relative to the polar axis 1711. Additionally or alternatively, the location 1720 can be defined in Euclidean space. For example, the location 1720 can be defined in Cartesian coordinates and have a distance 1722 relative to the center location 1718.

The AR system can guide a user to direct their gaze 1713 towards a waypoint 1714 based on the location 1720 of the waypoint 1714. For example, the AR system may render or virtually project one or more waypoints 1714 having different locations 1720. The AR system may determine a nearest waypoint 1714 based on the distance of a waypoint's location 1720 relative to the center point 1718. The AR system may then guide the user to direct their gaze 1713 towards the nearest waypoint 1714 based on that determination.

The AR system can guide a user to direct their gaze 1713 towards a waypoint 1714 based on an angle or distance between the user's gaze 1713 and a line 1712 between the user's eye and the waypoint. For example, the AR system can direct the user's gaze to the next waypoint based by using the smallest angle between user's gaze line and the line between the user's eye and the waypoint. For example, the AR system can determine the smallest angle θ2 1725 to the waypoint location 1720 on the display screen 1716. The AR system can then guide the user to observe the nearest waypoint 1714.

The AR system may guide the user to observe any of one or more waypoints 1714 based on any number of criteria related to the mesh map. For example, the AR system may determine that more data is needed at certain parts of a 3D region of the user's physical environment. The 3D region may be associated with a surface of the bounding box upon which the waypoints 1714 are rendered or virtually projected. The AR system may then guide the user to direct their gaze 1713 towards waypoints associated with the parts of the 3D region that need more data. For example, the AR system may guide the user to direct their gaze 1713 towards a waypoint associated with an unmeshed area of the 3D region upon which the waypoints 1714 are rendered or virtually projected. In another example, the AR system can guide the user to observe a nearest waypoint location 1720 associated with an unmeshed area of the 3D region.

J. Bounding Box

Figure 18:
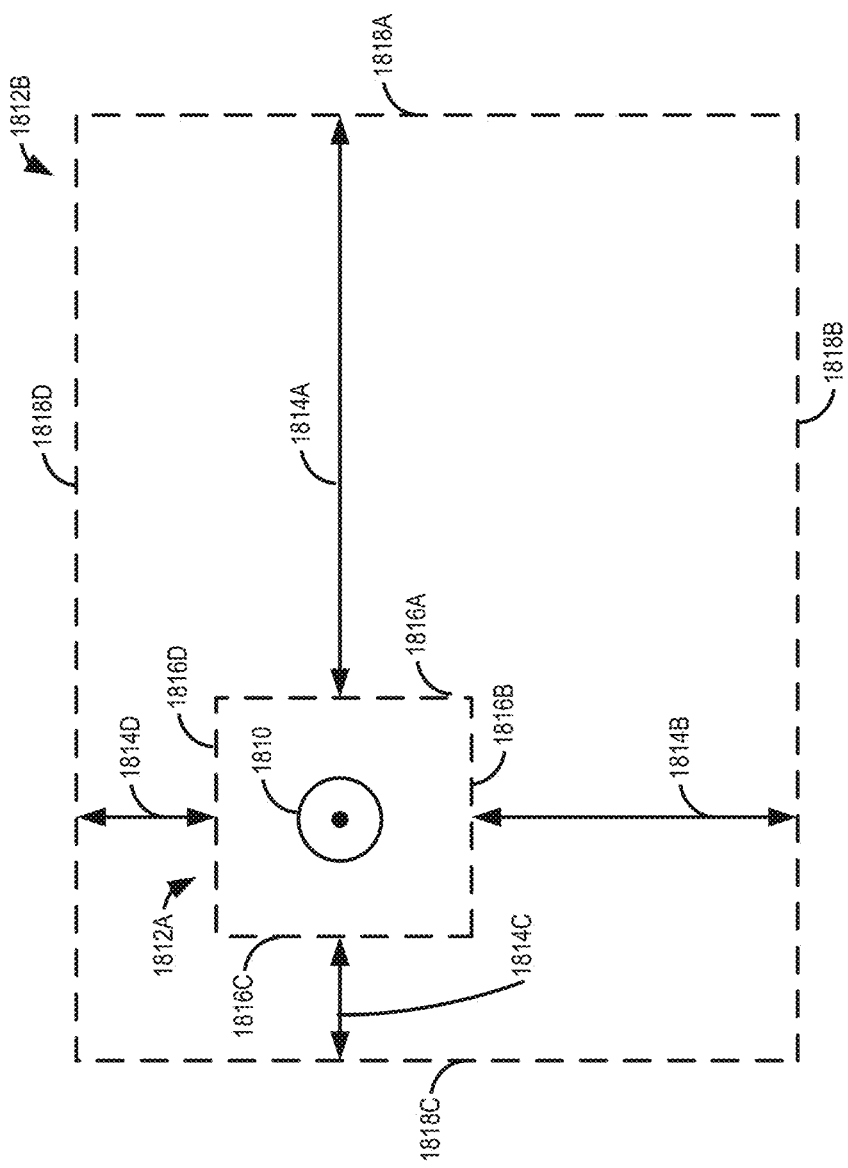
FIG. 18 illustrates a 2D cross-section representation of an example bounding box originating at a user.

FIG. 18 is a graphic illustrating a 2D cross-section representation of an example bounding box 1812 from a top down view that may be used to virtually project or render waypoints around location 1810. The bounding box 1812 can correspond to any 3D geometry. For example, FIG. 18 shows a 2D representation of an example cuboid bounding box having six surfaces. The bounding box 1812 can be positioned at a location 1810. The AR system can modify the size or shape of bounding box 1812A to a bounding box 1812B according to any suitable criteria (e.g., due to movement of the user, partial or full completion of the waypoint process, etc.). The modification in size or shape can be symmetric or asymmetric. For example, the bounding box 1812B can have different proportions than bounding box 1812A.

The location 1810 can be any suitable location relative to the AR system or the user. For example, the location 1810 can be a location of a user's head. In another example, the location 1810 can be a location of the user's hand or other body part. Additionally or alternatively, the location 1810 can correspond to a position of an AR device, such as an HMD or mobile device.

The bounding box 1812 can have any suitable size or shape. For example, the bounding box 1812 can correspond to a 3D region of space within the physical environment of the user. The bounding box 1812 can correspond to a geometric shape suitable to mesh for use with an AR system. For example, the bounding box 1812 can be a cuboid, sphere, or any other geometric shape.

In some embodiments, the volume of the bounding box 1812 can be fixed. For example, the bounding box 1812 can be a geometric shape with a fixed volume, such as a cuboid centered at the location 1810.

Additionally or alternatively, the volume of the bounding box 1812 can be modifiable. For example, the bounding box 1812 can initially be small (1812A) and expand to a larger bounding box (1812B). For example, an initial volume of the bounding box 1812 can be 0. The AR system can then increase the size or volume of the bounding box 1812. For example, the AR system can increase the size or volume of the bounding box 1812 to encompass the user. Additionally or alternatively, the AR system can increase the size or volume of the bounding box 1812 to encompass a meshed area of 3D space within the user's environment. For example, once a portion of the bounding box has been meshed, the meshed area may extend outside of the initial bounding box, and the AR system can increase the volume of the bounding box to include the meshed area.

The AR system can modify the bounding box 1812A to generate a bounding box 1812B of the same or different shape or dimension than the bounding box 1812A. For example, the bounding box 1812A can be a cuboid bounding box having six sides, including sides 1816A, 1816B, 1816C, and 1816D. The AR system can push out the sides of the cuboid bounding box to generate a bounding box 1812B. For example, the AR system can push out portions of the region asymmetrically. For example, if the bounding box 1812A is a cuboid bounding box, the AR system can add different amounts of padding to the bounding box 1812A. A padding can include any number of areas or volumes. For example, as illustrated in FIG. 18, the AR system can add padding 1814A to side 1816A, add padding to 1814B to side 1816B, add padding 1814C to side 1816C, or add padding 1814D to side 1816D. Additionally or alternatively, the AR system can add padding to other portions of the bounding box 1812A.

K. Determining Waypoint Locations

Figure 19A:
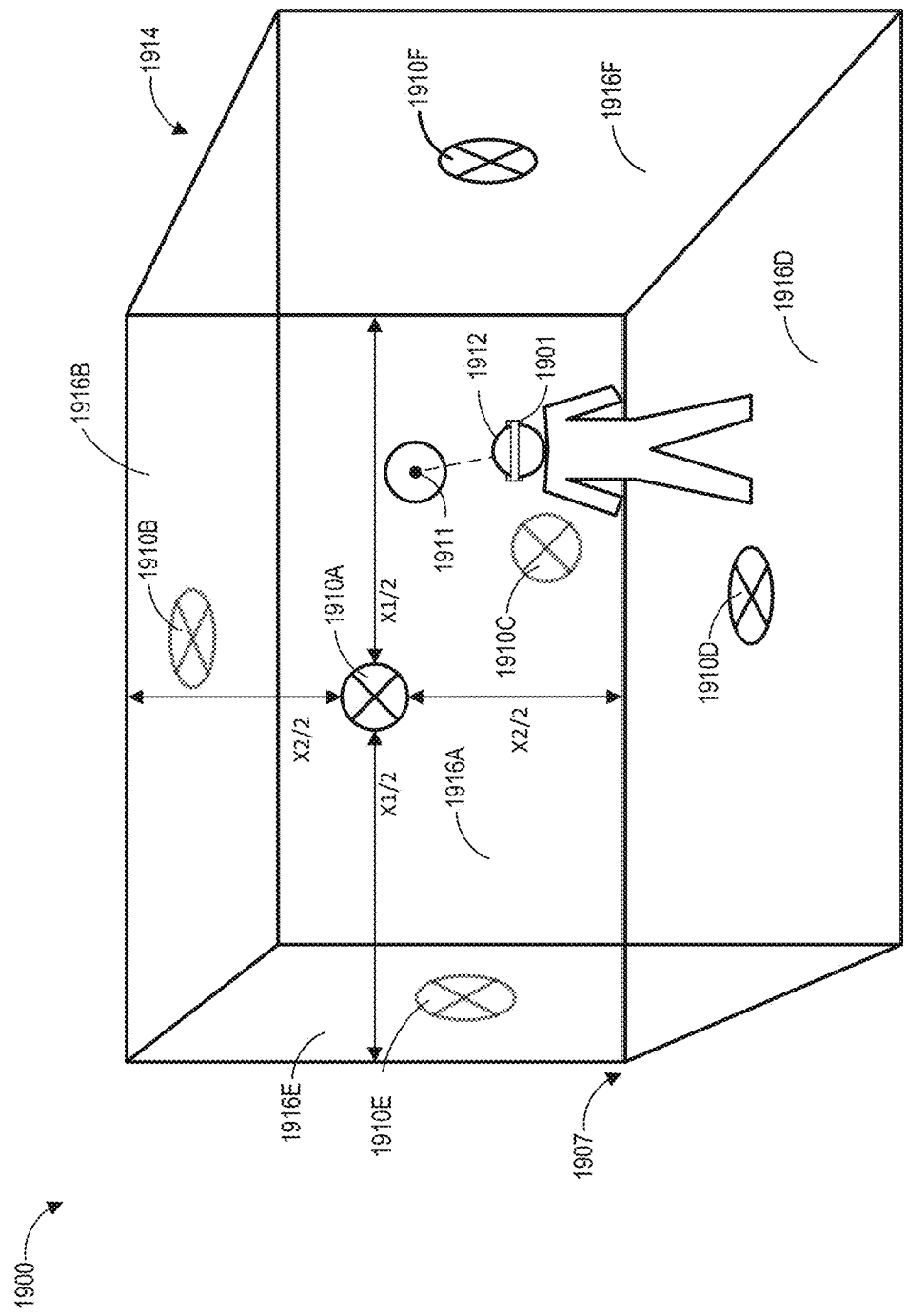
FIG. 19A illustrates example waypoint locations on an example bounding box.

FIG. 19A illustrates example meshing environment 1900 showing waypoint locations on an example bounding box. For example, an AR system 1901 can generate a bounding box 1914 around a user 1912. The bounding box 1914 can have one or more surfaces (e.g., 1916A, 1916B, 1916D, 1916E, 1916F). The AR system 1901 can determine locations (e.g., 1910A, 1910B, 1910C, 1910D, 1910E, 1910F) on the one or more surfaces of the bounding box 1914 to render or virtually project waypoints.

The AR system 1901 can determine the number and location (1910A, 1910B, 1910C, 1910D, 1910E, 1910F) of waypoints on the one or more surfaces (1916A, 1916B, 1916D, 1916E, 1916F) of the bounding box 1914 using any number of criteria. The criteria can include information associated with the geometric shape of the bounding box 1914, such as the number of sides, symmetry of the shape, orientation of the shape, or any other geometric properties of the bounding box 1914. For example, the shape of the bounding box 1914 can include a cuboid. The information associated with the cuboid shape can include that it has six sides. The AR system 1901 can render or virtually project waypoints for each of the six sides of the cuboid bounding box 1914. The projected locations (1910A, 1910B, 1910C, 1910D, 1910E, 1910F) of the waypoints can include any number of locations on the one or more surfaces (1916A, 1916B, 1916D, 1916E, 1916F) of the cuboid bounding box 1914. For example, the AR system 1901 can select waypoint locations at central points on the one or more surfaces (1916A, 1916B, 1916D, 1916E, 1916F). A central point can include the geometric center of a surface. For example, a surface 1916A can have a length of X1 and a height of X2. The central point can include a point at a location of half the length (e.g., X1/2) and half the height (e.g., X2/2) of the surface 1916A relative to a corner 1917 of the surface 1916A. Additionally or alternatively, the location can include a location relative to an initial observation direction 1911 of the user 1912. For example, the waypoint location can be a location on the bounding box 1914 that intersects with the user's initial observation direction 1911 when the bounding box 1914 is generated.

Additionally or alternatively, the criteria can include map point locations, previous keyframe captures, or the existence of already meshed portions of the bounding box 1914. For example, the AR system 1901 can determine that a portion of the bounding box 1914 has already been meshed. The AR system 1901 can then select waypoint locations (1910A, 1910B, 1910C, 1910D, 1910E, 1910F) that correspond to portions of the bounding box 1914 that have not been meshed. For example, the bounding box 1914 may be a cuboid having a surface 1916A. A portion of the surface 1916A may be meshed around a location corresponding to a user's initial observation direction 1911 shortly after or while the bounding box 1914 is generated. The AR system 1901 may determine a waypoint location 1910A (e.g. on the surface 1916A) at a position away from the meshed portion of the surface 1916A in order to mesh a different portion of the surface 1916A.

Additionally or alternatively, the criteria can include information associated with the user 1912 or AR system 1901. For example, a portion of the surface 1916A may be meshed around a location corresponding to a user's 1912 or the AR system's 1901 initial facing direction within the bounding box 1914. The AR system 1901 may determine a waypoint location at a point associated with that initial facing direction. For example, an AR system 1901 may be facing a surface 1916F of a cuboid bounding box 1914. The AR system 1901 can generate a waypoint at a center location 1910F of the surface 1916F such that the generated waypoint is in the center of the display of the AR system 1901.

Additionally or alternatively, the criteria can include any number of other suitable conditions or information associated with the user 1912, the AR system 1901, the bounding box 1914, or the user's 1912 physical environment. For example, user's 1912 physical environment can include an outdoor location with an open sky. The AR system 1901 may be able to recognize the open sky and determine that a waypoint location is not necessary because the AR system 1901 can approximate map points to mesh the open sky. Additionally or alternatively, the AR system 1901 may be able to recognize more complex areas of the user's 1912 physical environment within the bounding box 1914 and generate waypoint locations corresponding to the more complex areas. For example, the bounding box 1914 may encompass a set of table and chairs in a room. The table and chairs may require more map points to properly mesh. Thus, the AR system 1901 may generate waypoints at locations near or on the table and chairs in order to collect more keyframe captures for those extra map points and mesh that portion of the user's physical environment.

The waypoint locations (1910A, 1910B, 1910C, 1910D, 1910E, 1910F) can be fixed or variable with respect to surfaces of the bounding box 1914. For example, the waypoint locations (1910A, 1910B, 1910C, 1910D, 1910E, 1910F) can be fixed with respect to the one or more surfaces (1916A, 1916B, 1916D, 1916E, 1916F) of the bounding box 1914. In another example, the waypoint locations (1910A, 1910B, 1910C, 1910D, 1910E, 1910F) can be variable with respect to the one or more surfaces (1916A, 1916B, 1916D, 1916E, 1916F) of the bounding box 1914 and fixed relative to the user's 1912 physical environment or the user or AR system 1901's orientation within the user's 1912 physical environment or bounding box 1914.

Figure 19B:
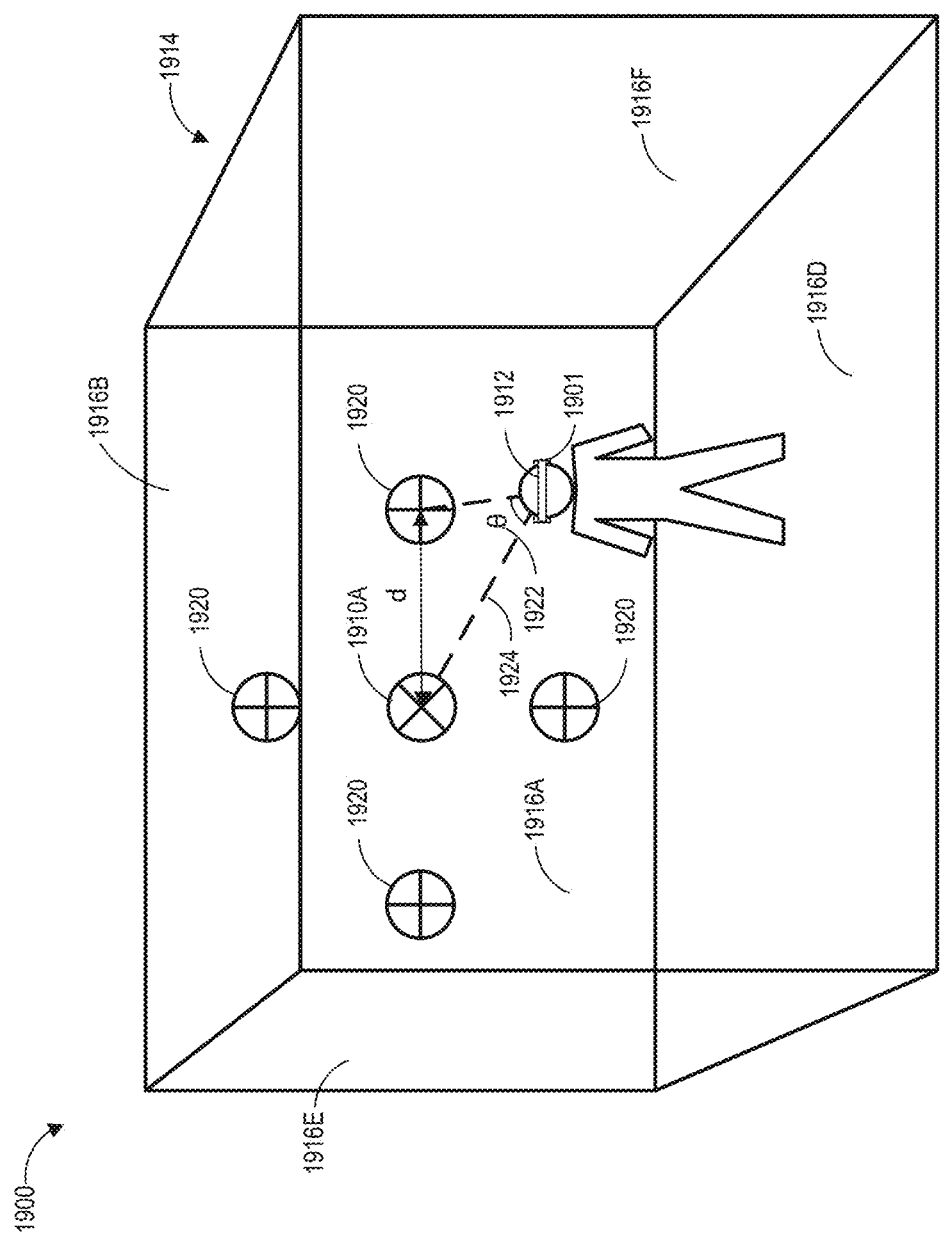
FIG. 19B illustrates example sub-waypoint locations on an example bounding box.

As illustrated in FIG. 19B, the AR system 1901 can determine waypoint locations 1920 with respect to other waypoint locations 1910A. For example, AR system 1901 can determine one or more initial waypoint locations 1910A on a surface 1916A associated with a bounding box 1914. The AR system 1901 can determine subsequent waypoint locations 1920. The subsequent waypoint locations (sometimes referred to as sub-waypoint locations) 1920 can be at a distance $\theta$ 1922 in polar or spherical coordinates from a polar axis 1924 defined according to a line formed between the user 1912 and the waypoint location 1910A. For example, the waypoint locations 1920 can be, e.g., 5 degrees, 10 degrees, 15 degrees, or more from the polar axis 1924. Additionally or alternatively, the subsequent waypoint locations 1920 can be at a distance d in Euclidean space from the initial waypoint location 1910A. The distance d can be a fraction of the size of a surface of the bounding box, e.g., ⅕, ¼, ⅓, ½ or more of the size.

The number and location of subsequent waypoint locations 1920 can be predetermined, based on the initial waypoint locations, the bounding box 1914 geometry, or information collected by the AR system 1901. The subsequent waypoint locations 1920 can be determined based on the geometry of the bounding box 1914 such that waypoint locations 1920 are selected to guide the user to direct their gaze to locations within the bounding box 1914 that includes the majority of the bounding box 1914. For example, the AR system 1901 can determine that a cuboid bounding box 1914 can have six initial waypoint locations and four subsequent waypoint locations 1920 for each of the six initial waypoint locations 1910A. In another example, the AR system 1901 can determine that a spherical bounding box 1914 can have an initial five waypoint locations 1920 and five subsequent locations 1920 for each of the five initial waypoint locations 1910A.

A subsequent waypoint location 1920 can be determined based on information captured by the AR system 1901. For example, the AR system 1901 can guide the user to look at or point the AR system 1901 towards waypoint locations 1910A, 1910B, 1910C, 1910D, 1910E, and 1910F. The AR system 1901 may capture information using one or more outward facing cameras. The AR system 1901 may use the captured information to determine the subsequent waypoint locations 1920. For example, the AR system 1901 can perform keyframe captures at the initial waypoint locations 1910A, 1910B, 1910C, 1910D, 1910E, or 1910F. The AR system 1901 can generate a mesh associated with those keyframe captures. There may be portions of the bounding box 1914 that are not meshed. The AR system 1901 can determine subsequent waypoint locations 1920 that are associated with portions of the bounding box 1914 that are not meshed.

A number of waypoints or waypoint locations for initial and subsequent waypoints can be any suitable number for the user's physical environment or bounding box geometry. For example, the AR system can determine or render between 0 and 100 waypoints and waypoint locations. For example, the AR system can determine 6, 21, or 54 waypoints. The AR system can determine or render any number of waypoints on each surface of the bounding box. For example, the AR system can determine or render between 0 and 10 waypoints and waypoint locations on each surface. For example, the AR system can determine five waypoints on a floor surface of the bounding box. In another example, the AR system can determine four waypoints on an upper surface of the bounding box. In another example, the AR system can determine three waypoints on a side surface of the bounding box.

L. User Interaction with Waypoints

Figure 20:
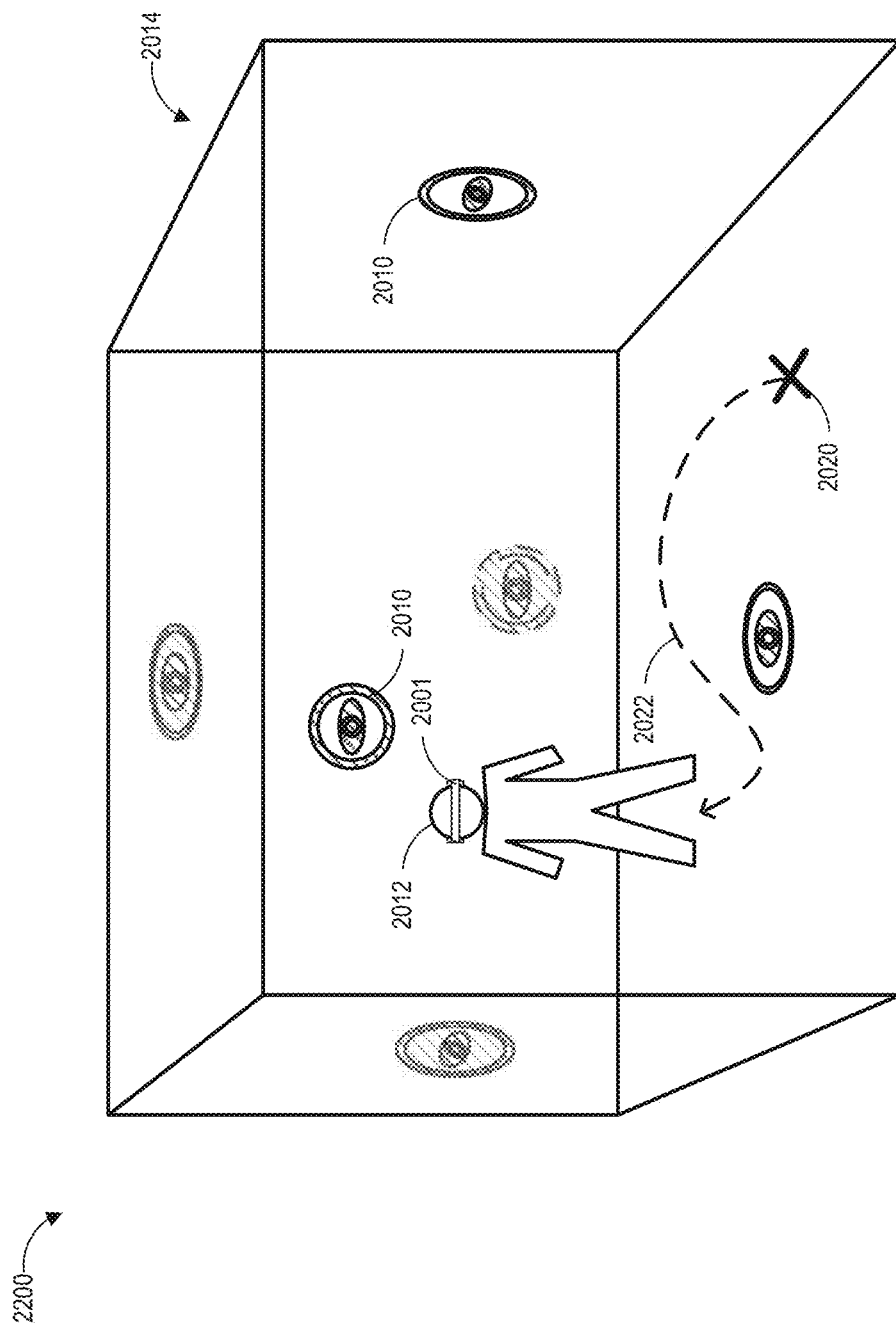
FIG. 20 illustrates a user moving within an example bounding box.

FIG. 20 illustrates an example MR environment 220 that can include a user moving within their physical environment. For example, the AR system 2001 can generate waypoints 2010 on surfaces of the bounding box 2014. The bounding box 2014 may be generated around a user 2012 at an initial location 2020. The user may move within their physical environment along a path 2022 shown as a dashed line in FIG. 20.

The bounding box 2014 can be fixed relative to the user's 2012 initial location 2020. For example, the bounding box 2014 can be generated around the user 2012 at location 2020. The user 2014 may move around within the bounding box 2014 in order to look at the waypoints 2010 on one or more surfaces of the bounding box 2014. Additionally or alternatively, the user 2014 may move outside of the bounding box 2014. Where the user 2014 moves outside the bounding box 2014, the AR system 2001 may maintain the same waypoint locations 2010 on the one or more surfaces of the bounding box 2014, independent from the position of the user. Additionally or alternatively, where the user 2014 moves outside the bounding box 2014, the AR system 2001 may expand the bounding box 2014 to encompass the user 2012. Where the AR system 2001 expands the bounding box 2014, the AR system 2001 may determine and render or project additional waypoints 2010 for the expanded portion of the bounding box 2014.

Additionally or alternatively, the bounding box 2014 may move relative to the user 2014 or AR system 2001. For example, the user 2012 may move outside the bounding box 2014. Where the user 2014 moves outside the bounding box 2014, the AR system 2001 can move the bounding box 2014 to encompass the user 2012 without significantly modifying the bounding box 2014. The AR system 2001 may generate new waypoints 2010 relative to the user's 2012 new location. Additionally or alternatively, the AR system 2001 may fix the waypoints 2010 relative to the bounding box 2014 such that the waypoints 2010 move with the bounding box 2014.

M. User Guidance

Figure 21:
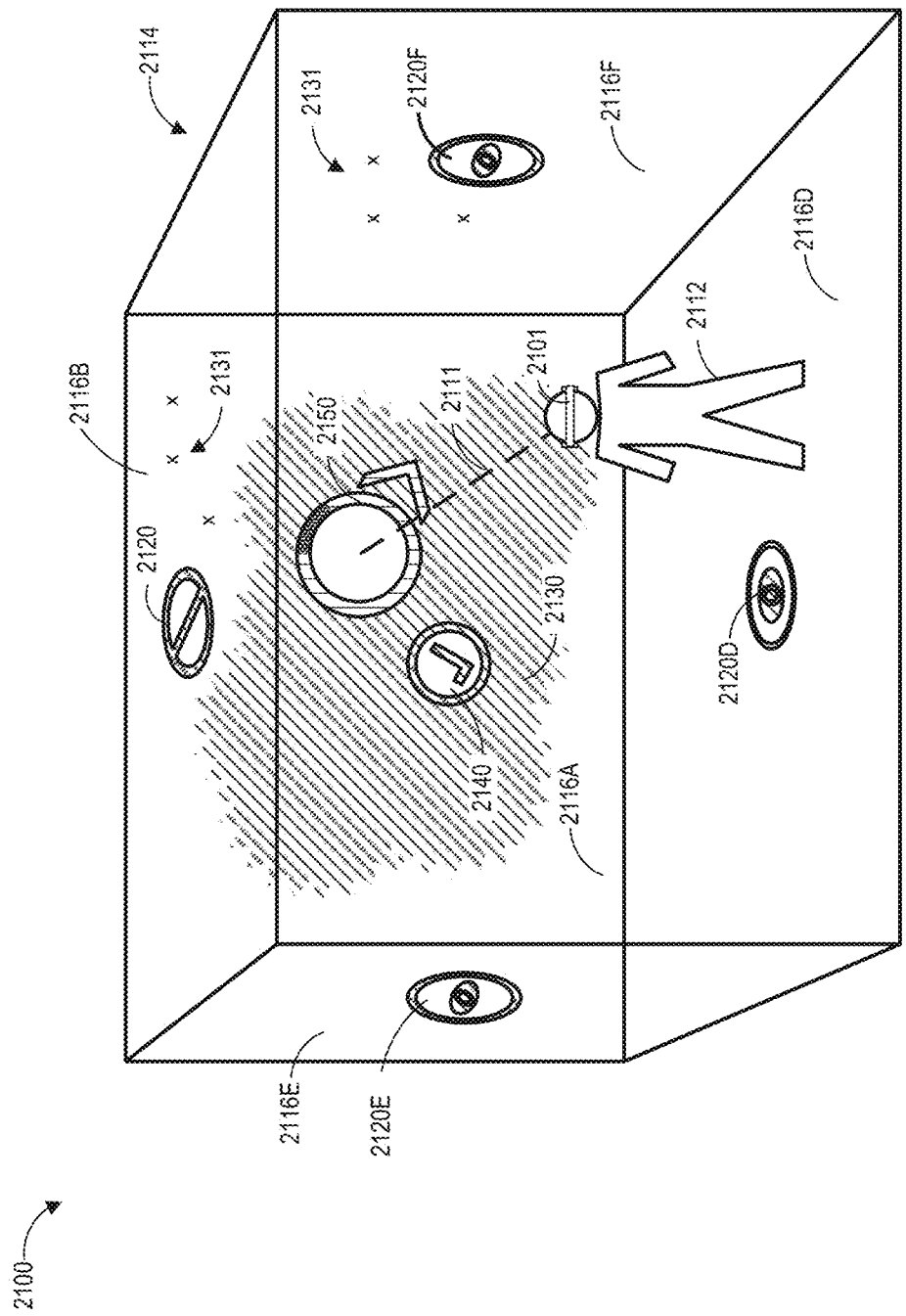
FIG. 21 illustrates an example guidance for a user to capture data at different waypoints.

FIG. 21 shows an example MR environment 2100 that can include a guidance 2150 to guide a user to sequentially observe (by, for example facing an outward facing camera of an AR system 2101 at) unmeshed areas 2131 in an example bounding box 2114. For example, the AR system 2101 can utilize a guidance 2150 to direct the user's observation 2111 to unmeshed areas associated with waypoints 2120D, 2120E, 2120F. The guidance 2150 can include directional information to guide the user to the next waypoint in a sequence. Upon successful completion of a mesh at a waypoint location, the AR system 2101 can notify the user of success. For example, the AR system 2101 can display a success marker 2140 or display a rendering of a mesh 2130 on the surface 2116A of the bounding box 2114. Upon failure to mesh at a waypoint location, the AR system 2101 can notify a user of failure. For example, the AR system 2101 can display a failure marker 2120 or display a representation of a failed mesh 2131 on the surface 2116B of the bounding box 2114.

A guidance 2150 can be any suitable guide or indicator to guide the user 2112 to observe a portion of their physical environment. For example, as illustrated in FIG. 21, the guidance 2150 can be visual. However, it will be appreciated that the guidance 2150 can include indicators for any number of user senses.

The guidance 2105 can any combination of visual, audible, or haptic. For example, the guidance 2105 can include sound(s) or verbal instruction (e.g., from the speaker 240 of FIG. 2) as to a direction to point the outward facing camera of the AR system 2101. Additionally or alternatively, the guidance 2150 can include a visual guide to indicate a direction to point the outward facing camera of an AR system 2101. The visual guide can also indicate the current facing direction of the outward facing camera of the AR system 2101. The visual guide can include a graphical guidance or a text instruction or guidance. Additionally or alternatively, the guidance 2150 can include haptic feedback (e.g., from a haptic device or totem, such as the user input device 466 of FIG. 4) associated with the current facing direction of the outward facing camera of the AR device and the waypoint locations. For example, the haptic feedback can include a pulsing signal from a user input device. The pulsing signal can have a particular frequency or pattern. The AR system can change the pulsing signal's frequency or pattern based on the current facing direction of the outward facing camera of the AR device and the waypoint locations. For example, as the outward facing camera points closer to a waypoint location, the AR system can increase the frequency of the pulsing signal.

FIGS. 22A-22D illustrate various example guidance visuals provided by the AR system to direct a user to point the AR system 2101 at a location on the bounding box 2114. For example, a guidance visual 2210 can direct a user to point the outward facing camera associated with an AR system 2101 towards a waypoint 2216 that may be located on a surface (2116A, 2116B, 2116D, 2116E, 2116F) of a bounding box 2114.

Figure 22B:
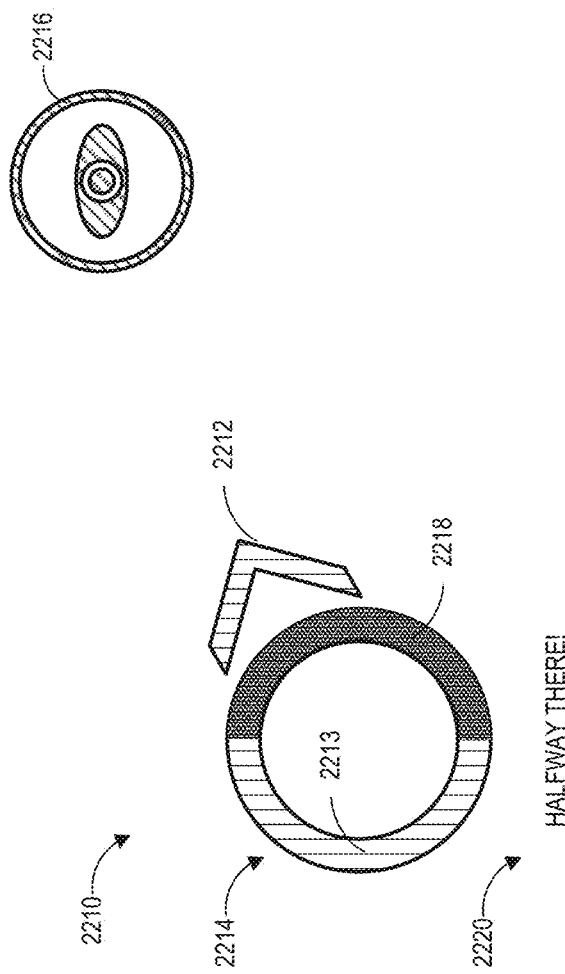
FIG. 22B illustrates another example guidance for a user to capture data at different waypoints.
Figure 22C:
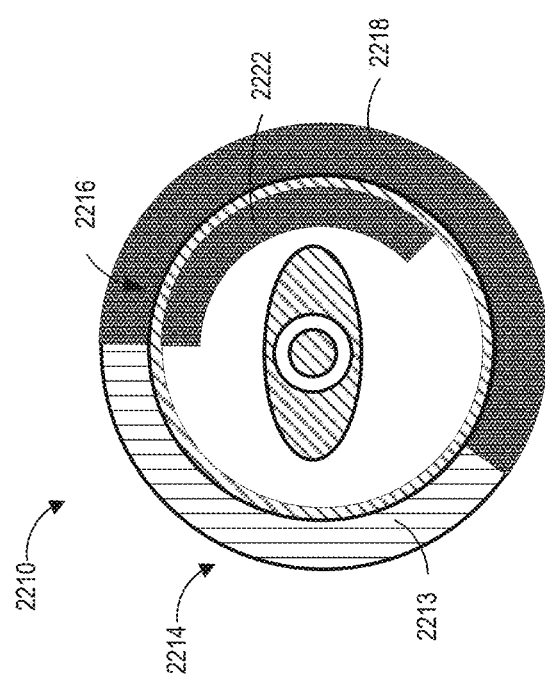
FIG. 22C illustrates an example guidance while a user is capturing data at a waypoint location.
Figure 22D:
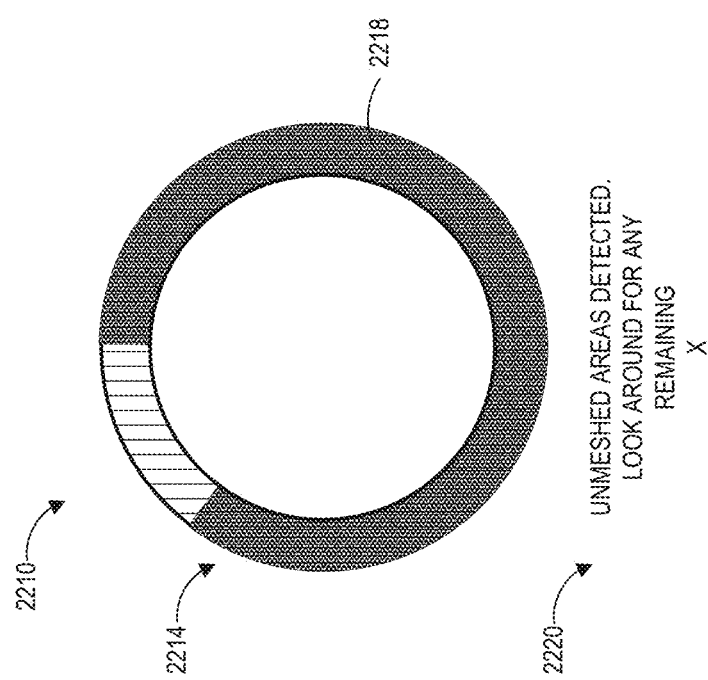
FIG. 22D illustrates an example guidance for a user to capture data at unmeshed portions of the user's environment.

The guidance visual 2210 can change according to mesh conditions, such as how much of the bounding box 2114 has been meshed, a number of waypoints that have yet to be completed or that have been completed, some combination thereof or the like. For example, as illustrated in FIG. 22A at a start of the mesh process or at the initial virtual projection of the waypoints 2216, the AR system 2101 can include instructions as to what the user should look for in the bounding box 2114. In another example, FIG. 22B illustrates an example guidance visual 2210 that may be displayed (e.g. rendered or virtually projected) by an AR system 2101 during a mesh process. In another example, FIG. 22C illustrates an example of the guidance visual 2210 that may be displayed (e.g. rendered or virtually projected) by an AR system 2101 while an outward facing camera is facing a waypoint 2216. In another example, FIG. 22D illustrates an example guidance visual 2210 that may be displayed (e.g. rendered or virtually projected) by an AR system 2101 after waypoints 2216 have been processed and there are still unmeshed portions of a bounding box 2114.

The guidance visual 2210 can include a graphic 2214 or text 2220. The guidance visual 2210 may be displayed by the AR system 2101 at any point during a meshing process. For example, the guidance visual 2210 can be displayed upon start of the initial virtual projection of the waypoints 2216. The guidance visual 2210 can display the graphic 2214 or the text 2220 separately or concurrently. For example, the graphic 2214 can appear without the text 2220 or the text 2220 can be displayed without the graphic 2214. In some embodiments, the graphic 2214 or text 2220 may be displayed if the display system does not complete a waypoint within a time threshold.

The text 2220 can include verbal or graphic instruction associated with a guidance 2150. For example, the text 2220 can include written instructions to look at waypoints. In the illustrated example of FIG. 22A, the text 2220 states that the user should "Look around for [waypoints] to setup your virtual environment," with a graphic in place of "[waypoints]". In another example, the text 2220 can include text indicating how many more waypoints can, should be, or have been attempted. In the illustrated example of FIG. 22B, the text 2220 states that the user is "halfway there!" to indicate that half of the waypoints 2216 have been attempted. Additionally or alternatively, the text 2220 can include an animation associated with an instruction. For example, the text 2220 can include an animation to indicate to the user how much of the mesh is complete, such as a variable bar graph or progress bar. Use of such instructions or graphics advantageously can increase the enjoyability of the waypoint process for the user.

The graphic 2214 can be any number of visuals of any number of sizes or shapes. For example, the graphic 2214 can include a geometric shape 2213 approximately corresponding to the geometric shape of the waypoints 2216. Advantageously, using a geometric shape 2213 approximately corresponding to the geometric shape of the waypoints 2216 can aid the user in matching the guidance 2210 to the waypoints 2216. For example, the waypoints 2216 may have a circular outer shape. The graphic 2214 can include a ring shape 2213 that approximately corresponds to the size and shape of the waypoints 2216.

Additionally or alternatively, the graphic 2214 can include a directional component 2212. The directional component 2212 can include a visual that indicates a direction for the user to look in the user's physical environment. For example, the directional component 2212 can be an arrow, chevron, some combination thereof or the like. The directional component 2212 can indicate a direction towards a waypoint 2216 that may be associated with a portion of the user's physical environment. Additionally or alternatively, the directional component 2212 can indicate a direction towards an unmeshed area of the user's physical environment.

The AR system can change the graphic 2214 according to mesh conditions, such as how much of the bounding box 2114 has been meshed, a number of waypoints that have yet to be completed or that have been completed, some combination thereof or the like. For example, the graphic 2214 can include a region progress indicator 2218 that indicates the amount of progress that the user has made towards a determined goal. The region progress indicator 2218 can be any suitable visual for displaying an amount of progress towards reaching a determined goal. For example, in the illustrated example in FIG. 22B, the region progress indicator 2218 includes a partial ring shape to overlay the ring shape 2213. In another example, the region progress indicator 2218 can include a progress bar, pie graph, a combination thereof or the like. The region progress indicator 2218 can indicate progress towards the goal of the user facing the outward facing camera of the AR system 2101 at each waypoint location on the bounding box 2114. Additionally or alternatively, the region progress indicator 2218 can indicate progress towards meshing the entire or a portion of the bounding box 2114.

As illustrated in FIG. 22C, the AR system 2101 can modify the guidance visual 2210 or waypoint 2216 to indicate meshing progress while an outward facing camera of an AR system 2101 is pointed at a waypoint 2216. For example, the AR system 2101 can display a waypoint progress indicator 2222. The waypoint progress indicator 2222 can be any suitable visual for displaying an amount of progress towards meshing (e.g., generating a mesh map of the user's environment). For example, in the illustrated example in FIG. 22C, the waypoint progress indicator 2222 includes a partial ring shape that can be placed inside or adjacent to the waypoint 2216 during observation of a waypoint 2216. In another example, the waypoint progress indicator 2222 can include a progress bar, pie graph, a combination thereof or the like. The region progress indicator 2218 can indicate progress towards the meshing a portion of the bounding box 2114 surrounding the waypoint 2216.

As illustrated in FIG. 22D, the guidance visual 2210 can guide a user to face an outward facing camera of an AR system 2101 to unmeshed areas 2131 of a bounding box 2114. For example, the user may have attempted to mesh all the generated waypoints in a bounding box 2114. The AR system 2101 may have been unable to mesh a portion of the bounding box 2114 (e.g. unmeshed area 2131 in FIG. 21). The AR system 2101 can guide the user to face the outward facing camera of the AR system 2101 towards unmeshed areas 2131 that may not have associated waypoints 2216. As mentioned above, the guidance visual 2210 can include a region progress indicator 2218. Where no waypoints 2216 are displayed on surfaces (2116A, 2116B, 2116D, 2116E, 2116F) in the bounding box 2114, the region progress indicator 2218 can indicate progress towards meshing the entire or a portion of the bounding box 2114.

N. Example Meshing Process

Figure 23:
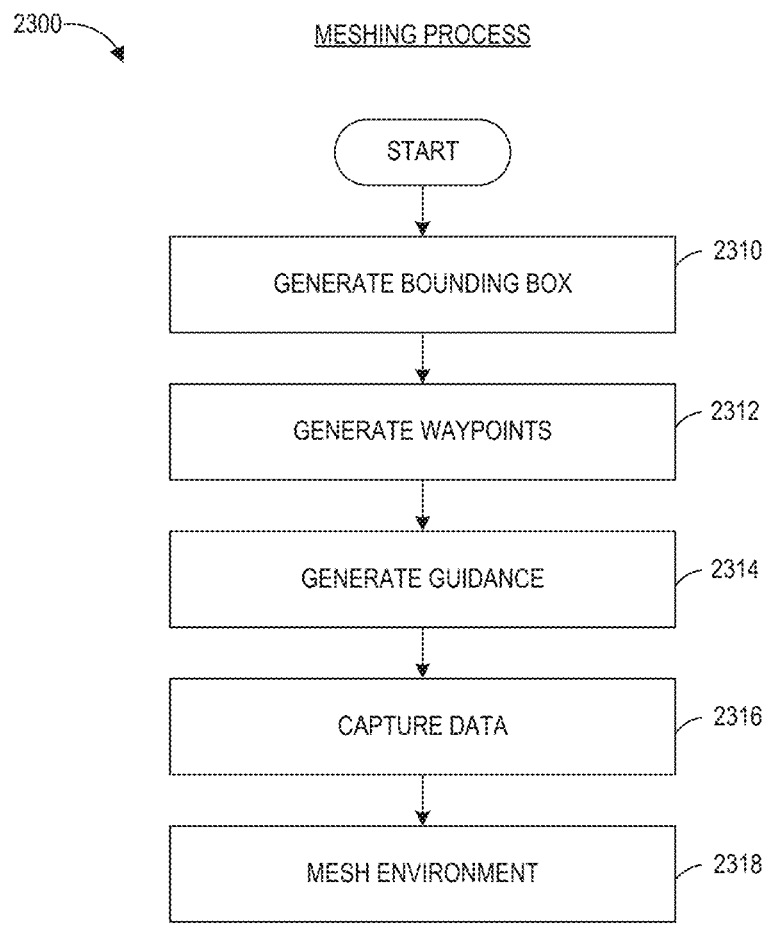
FIG. 23 is a process flow diagram of an example method for mapping a user's environment with waypoints.

FIG. 23 is a process flow diagram of an example process 2300 for mapping a user's environment with waypoints. The process 2300 may be implemented by an AR system, such as AR system 200. For example, the process 2300 can include a bounding box generation step at block 2310, a waypoint determination step at block 2312, a visual guidance determination step at block 2314, a data capture step at block 2323, and a mesh step at block 2318.

At a block 2310, the AR system can generate a bounding box. As described above with reference to FIG. 18, the bounding box can correspond to any 3D space of any size or shape. The AR system may modify the bounding box at block 2310 to encompass objects outside the bounding box within the user's physical environment. For example, the AR system may expand the bounding box to encompass the user. In another example, the AR system may expand the bounding box to encompass a mesh or map points associated with objects within the user's physical environment.

At a block 2312, the AR system can determine waypoint locations and generate waypoints. As described with reference to FIGS. 19A-19B, the AR system can determine waypoint locations on one or more surfaces of a bounding box or region using any number of criteria. For example, the criteria can include information associated with the geometric shape of the bounding box, such as the number of sides, symmetry of the shape, orientation of the shape, or any other geometric properties of the bounding box. The AR system can additionally or alternatively generate waypoints based on other waypoint locations. For example, the AR system can determine initial waypoint locations on a bounding box. The AR system can then determine subsequent waypoint locations in relation to the initial waypoint locations.

At a block 2314, the AR system can generate a guidance. The guidance can be a visual, audible, or tactile indicator to the user of the AR system to move an outward facing camera of the AR system. For example, as described with reference to FIGS. 21-22D, the guidance can include a guidance visual 2210. The guidance can guide the user to move the outward facing camera of the AR system to point at waypoints or unmeshed areas of the bounding box. The guidance can change according to different conditions. The conditions can include how much of the bounding box has been meshed, a number of waypoints that have yet to be completed or that have been completed, some combination thereof or the like.

At a block 2316, the AR system can capture data. For example, as described with reference to FIGS. 13-16B, the AR system can capture information through one or more keyframes. For example a camera or other image capture device can capture images of the user's environment and generate keyframes. The information can include map point data associated with objects within the user's physical environment. The AR system may capture information associated within a bounding box or region generated at block 2310. Additionally or alternatively, the AR system may capture information associated with the waypoints determined at block 2312. For example, the AR system may direct the user, by the guidance generated at block 2314, to point an outward facing camera associated with the AR system towards a waypoint or unmeshed portion of the bounding box generated at block 2310. The AR system may detect that the outward facing camera is facing the waypoint or unmeshed portion of the bounding box and capture information associated with that waypoint or unmeshed area using the outward facing camera. For example, the outward facing camera can take one or more images of the user's physical environment while the outward facing camera is pointed at a waypoint or an unmeshed portion of a bounding box.

At a block 2318, the AR system can mesh the environment of the user. For example, the AR system can determine map points for objects captured at block 2316. The AR system can use the map points to generate a digital re-creation of the physical environment of the user in the form of, for example, a mesh map, a sparse map, or a dense map. The digital re-creation of the physical environment can then be utilized to place and control virtual content. The AR system can indicate to the user that a digital re-creation has been generated by generating and displaying a 2D or 3D representation of the digital re-creation. For example, the AR system can display a set of connected map points as a representation of a mesh.

O. Example User Feedback

Figure 24:
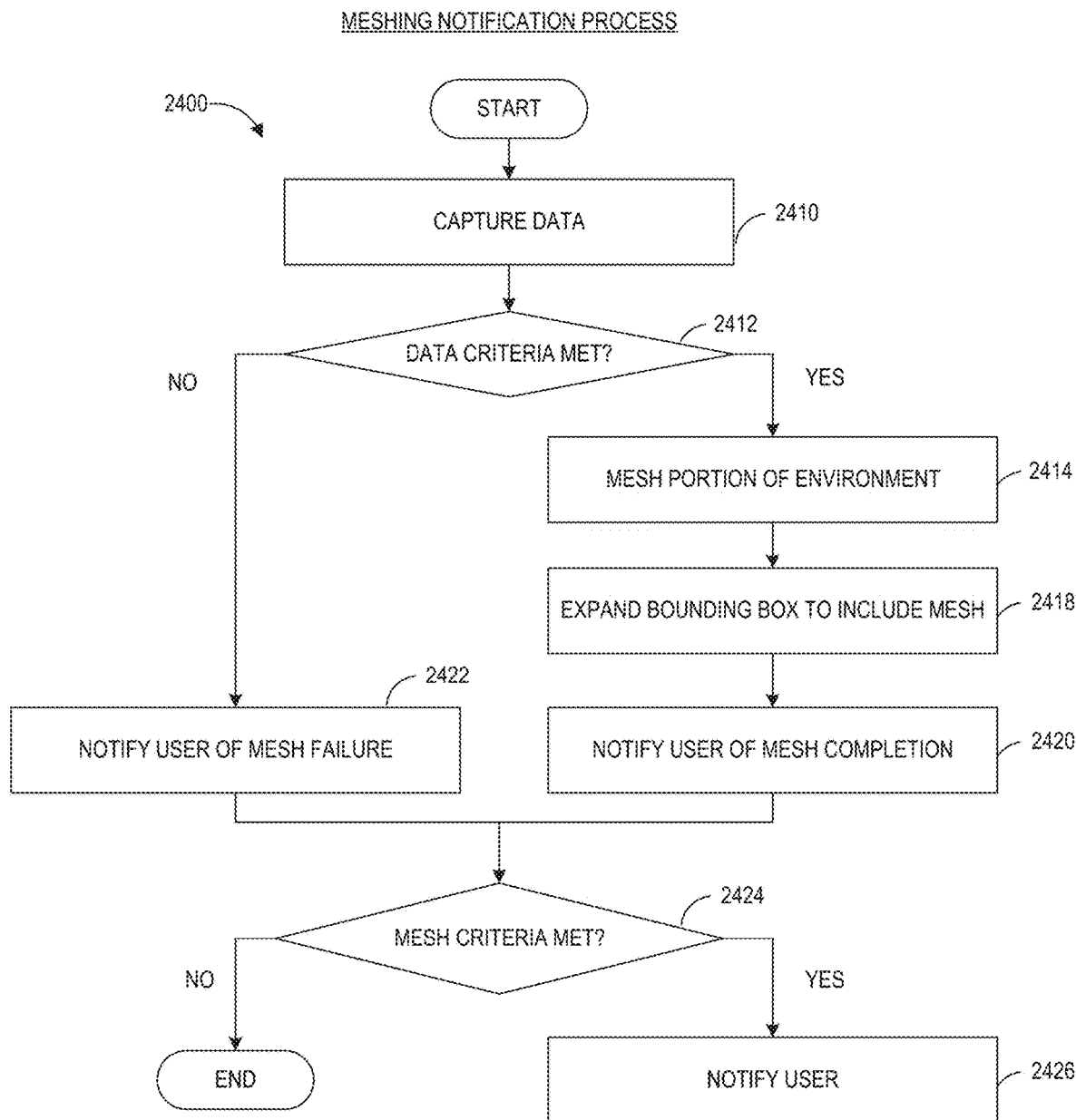
FIG. 24 is a process flow diagram of an example method for notifying a user of mesh completion.

FIG. 24 is a process flow diagram of an example process 2400 for notifying a user of mesh completion or failure. For example, the process 2400 can include a data capture step at block 2410, a data criteria determination step at a block 2412, a mesh step at a block 2414, a bounding box expansion step at a block 2418, a success notification step at a block 2420, a failure notification step at a block 2422, a mesh criteria determination step at a block 2424, and a user end notification step at a block 2426. The AR system 200 can perform the process 2400.

At a block 2410, the AR system can capture data. For example, as described with above with reference to FIG. 23 at block 2316, the AR system can capture information through one or more keyframes. The keyframes can include the outward facing camera of the AR system. The information can include map point data associated with objects within the user's physical environment. The AR system may capture information associated within a bounding box or region generated at block 2310. Additionally or alternatively, the AR system may capture information associated with the waypoints determined at block 2312. For example, the AR system may direct the user, by the guidance generated at block 2314, to point an outward facing camera associated with the AR system towards a waypoint or unmeshed portion of the bounding box generated at block 2310. The AR system may detect that an outward facing camera is facing the waypoint or unmeshed portion of the user's physical environment and capture information associated with that waypoint or unmeshed area using the outward facing camera.

At a block 2412, the AR system can determine whether the data from block 2410 meets a criterion. The criteria can include any suitable conditions for determining whether a mesh can be created using the data from block 2410. For example, the criteria can include a threshold signal to noise ratio for the captured data. In another example, the criteria can include a number of map points generated from the captured data. In another example, the criteria can include a user determination that a number of map points is satisfactory. If the criteria is met at block 2412, then the AR system can proceed to block 2414 and process the data to generate a mesh. If the criteria is not met at block 2412, then the AR system can proceed to block 2422 and notify the user of a mesh failure. Additionally or alternatively, the system can attempt to generate a mesh based on the captured data from block 2410 and then perform the criteria determination step at block 2412.

Additionally or alternatively, the blocks 2410 and 2412 can be combined into a single step. For example, the AR system can continually or periodically capture data until a criterion is met. The criteria can be a threshold number of map points that can be generated from the captured data. Additionally or alternatively, the criteria can be whether the data was captured under a time limit. For example, the AR system can capture data within a time limit of 3 to 10 seconds. For example, the AR system can capture data within a time limit of 5 seconds. If the AR system succeeds in capturing enough quality data to mesh the portion of the environment that the AR system is attempting to mesh under that time limit, the AR system may proceed to block 2414. If the AR system fails to capture enough quality data to mesh the environment, then the AR system may proceed to block 2422.

At block 2414, the AR system can mesh a portion of the physical environment. For example, the AR system can use the data from block 2410 to generate a digital re-creation of the physical environment of the user in the form of, for example, a mesh map. The portion of the physical environment that is meshed (e.g., for which a mesh map has been generated) can include one or more portions associated with one or more waypoints or unmeshed portions of a bounding box at which a user has captured data at a block 2410.

At block 2418, the AR system can expand a bounding box to encompass the meshed portion. For example, the AR system can capture data associated with a physical environment of the user that may be outside of the bounding box. The AR system can mesh that outside portion of the physical environment and expand the bounding box to encompass that portion of the physical environment.

At block 2420, the AR system can notify a user of a mesh completion for the portion of the physical environment of which the AR system captured data at block 2410. The notification can include audible, visual, or tactile feedback for the user. For example, the notification can include an audible chime. Additionally or alternatively, the notification can include the display of a representation of the completed mesh. For example, the AR system can indicate to the user that a map, e.g., a mesh map, a sparse map, or a dense map, has been generated by generating and displaying a 2D or 3D representation of the mesh. For example, the AR system can display a set of connected map points as a representation of the mesh. Additionally or alternatively, the notification can include haptic feedback from a totem associated with the AR system.

At block 2422, the AR system can notify a user of a mesh failure for the portion of the physical environment of which the AR system captured data at block 2410. The notification can include audible, visual, or tactile feedback for the user. For example, the notification can include an audible chime that may be different from the chime in block 2420. Additionally or alternatively, the notification can include the display of a representation of the failed mesh. For example, the AR system can display one or more failure symbols (e.g. the "x" symbols shown in FIG. 21 in unmeshed region 2131). Additionally or alternatively, the notification can include haptic feedback from a totem associated with the AR system.

At a block 2424, the AR system can determine whether the generated mesh meets a criterion. The criteria can include any suitable conditions for determining whether a mesh map of the user's physical environment is satisfactory for the display and interaction of virtual content. For example, the criteria can include a percentage of the physical environment that has been meshed. In another example, the criteria can whether certain surfaces of the user's physical environment have been identified (e.g. one or more walls or the floor). If the criteria is met at block 2424, then the AR system can proceed to block 2426 and notify the user of successful completion of the mesh map. If the criteria is not met at block 2424, then the AR system can end the process 2400 and optionally notify the user of the failed completion of the mesh map. Additionally or alternatively, the AR system can repeat the blocks 2410 through 2424 until the mesh criteria is met at block 2424.

P. Additional Aspects

In a 1st aspect, an augmented reality (AR) system comprises an augmented reality display system disposed within a physical environment, wherein the augmented reality display system captures data pertaining to the physical environment, and a server comprising a processor to receive the captured data from the individual augmented reality display system and to construct or retrieve at least a portion of a map of the real world comprising the physical location based at least in part on the received captured data.

In a 2nd aspect, the AR system of aspect 1, wherein the captured data comprises depth data (such as collected from a depth sensor coupled to the augmented reality display system) that can be indicative of the user's position relative to the physical environment.

In a 3rd aspect, the AR system of any of aspects 1-2, wherein the captured data comprises signed distance field values for a digital map of the physical environment. The digital map can be a mesh map, a sparse map, or a dense map.

In a 4th aspect, the AR system of any of aspects 1-3, wherein the captured data comprises a pre-loaded or created digital map of the physical environment at that location.

In a 5th aspect, the AR system of any of aspects 1-4, wherein the augmented reality display system creates a bounding box around the user.

In a 6th aspect, the AR system of any of aspects 1-5, wherein the AR system of any of aspects 1-2, the bounding box is a cuboid encapsulation around the user comprising virtual surfaces.

In a 7th aspect, the AR system of any of aspects 1-6, wherein the bounding box is a fixed volume encompassing the user.

In an 8th aspect, the AR system of any of aspects 1-6, wherein the bounding box has a dynamic volume, such that as the user receives captured data the bounding box expands to encapsulate digital marker(s) associated with that captured data (for example, a surface element (surfel) of a sparse point representing a physical space in the physical environment.

In a 9th aspect, the AR system of any of aspects 1-8, wherein a plurality of waypoints are projected to predetermined positions on the virtual surfaces of a bounding box.

In a 10th aspect, the AR system of any of aspects 1-9, wherein a user is prompted to observe at least one waypoint within the plurality of the waypoints.

In a 11th aspect, the AR system of any of aspects 1-10, wherein a sequential observation of the plurality of waypoints ensures the augmented reality display system has captured enough data points to either construct a mesh map of the physical environment or confirm a pre-loaded map is the correct one for the physical environment or confirm a position of the augmented reality display system within a pre-loaded map.

In a 12th aspect, the AR system of any of aspects 1-11, wherein the sequential observation is such that a user operating the augmented reality display system is prompted to observe a first waypoint of the plurality of waypoints.

In a 13th aspect, the AR system of any of aspects 1-12, wherein the first waypoint is that waypoint closest to the center of the augmented reality display system screen (e.g., the physical display through with the user is looking) at the time the bounding box is first created.

In a 14th aspect, the AR system of any of aspects 1-13, wherein the next waypoint in the sequential observation is the waypoint with the smallest Euclidean distance from the center of the screen to the waypoint center on the virtual surface of the bounding box.

In a 15th aspect, the AR system of any of aspects 1-14, wherein there are twenty one total waypoints in the sequence.

In a 16th aspect, the AR system of any of aspects 1-15, wherein five waypoints are on the lower virtual surface of the bounding box.

In a 17th aspect, the AR system of any of aspects 1-16, wherein four waypoints are on the upper virtual surface of the bounding box.

In an 18th aspect, the AR system of any of aspects 1-17, wherein three waypoints are on the side virtual surfaces of the bounding box.

In a 19th aspect, the AR system of any of aspects 1-18, wherein a digital map is constructed as the sequential observation is conducted.

In a 20th aspect, a method of building a map comprises extracting a set of map points from the captured data at each waypoint observation, and wherein the set of map points are used to construct the digital map of the physical environment world.

In a 21st aspect, the method of aspect 20, wherein the captured data comprises pose information of the augmented reality display systems, wherein the map is constructed based at least in part on the pose information.

In a 22nd aspect, a space-based sensor system comprises: at least one sensor to capture information pertaining to a space, wherein a pose of the image sensor relative to the space is known, and a processor to receive the captured information, and to construct a map of the world comprising the space based at least in part on the captured information, and to transmit the map to one or more augmented reality display systems such that virtual content is displayed to one or more users of the augmented reality display systems based at least on the constructed map.

In a 22nd aspect, the space-based sensor system of aspect 21, wherein the at least one sensor is an image-based sensor.

In a 23rd aspect, the space-based sensor system of any of aspects 21-22, wherein the at least one sensor is an audio sensor.

In a 24th aspect, the space-based sensor system of any of aspects 21-23, wherein the at least one sensor is an environmental sensor.

In a 25th aspect, the space-based sensor system of any of aspects 21-24, wherein the at least one sensor is a temperature-based sensor.

In a 26th aspect, the space-based sensor system of any of aspects 21-25, wherein the at least one sensor is a humidity-based sensor.

In a 27th aspect, the space-based sensor system of any of aspects 21-26, wherein the pose comprises a position of the at least one sensor within the room.

In a 28th aspect, the space-based sensor system of any of aspects 21-27, wherein the information is captured with respect to a reference frame corresponding to the space.

In a 29th aspect, the space-based sensor system of any of aspects 21-28, wherein the pose comprises an orientation of the at least one sensor within the room.

In a 30th aspect, the space-based sensor system of any of aspects 21-29, wherein the space-based sensor system is stationary.

In a 31st aspect, the space-based sensor system of any of aspects 21-30, wherein the processor performs one or more transformations to relate a reference frame of the space-based sensor to the reference frame corresponding to the space.

In a 32nd aspect, the space-based sensor system of any of aspects 21-31, wherein the transformation comprises a translation matrix.

In a 33rd aspect, the space-based sensor system of any of aspects 21-32, wherein the transformation comprises a rotation matrix.

In a 34th aspect, an augmented reality (AR) system comprises a passable world model comprising a set of map points corresponding to one or more objects of the real world, and a processor to communicate with one or more individual augmented reality display systems to pass a piece of the passable world to the one or more individual augmented reality display systems, wherein the piece of the passable world is passed based at least in part on respective locations corresponding to the one or more individual augmented reality display systems.

In a 35rd aspect, the AR system of aspect 34, wherein at least a portion of the passable world model resides in the one or more individual augmented reality display systems.

In a 36th aspect, the AR system of any of aspects 34-35, wherein at least a portion of the passable world model resides in a cloud-based server.

In a 37th aspect, the AR system of any of aspects 34-36, wherein the passable world is constantly updated based at least in part on information received from the one or more individual augmented reality display systems.

In a 38th aspect, the AR system of any of aspects 34-37, wherein a communication between the passable world model and the individual augmented reality systems is asynchronous.

In a 39th aspect, a method comprises detecting a location of a user of an augmented reality display system, retrieving, based on the detected location, data pertaining to the detected location of the user of the augmented reality display system, wherein the data pertaining to the detected location comprises map points corresponding to one or more real objects of the detected location, and displaying one or more virtual objects to the user of the augmented reality display system relative to the one or more real objects of the location, based at least in part on the retrieved data.

In a 40th aspect, the method of aspect 39, wherein the method further comprises determining a set of parameters corresponding to a movement of the user of the augmented reality system relative to the detected location, calculating, based on the determined movement of the user, an anticipated position of the user, and retrieving another data pertaining to the anticipated positon of the user, wherein the other data pertaining to the anticipated position comprises map points corresponding to one or more real objects of the anticipated position.

In a 41st aspect, the method of any of aspects 39-40, wherein the map points corresponding to one or more real objects are used to construct a map of the real world.

In a 42nd aspect, the method of any of aspects 39-41, wherein method further comprises recognizing one or more objects of the real world based on the map points.

In a 43rd aspect, the method of any of aspects 39-42, wherein the map points are used to create a coordinate space of the real world, and wherein the one or more virtual objects are displayed based on the created coordinate space of the real world.

In a 44rd aspect, the method of any of aspects 39-43, wherein the method further comprises recognizing one or more objects of the real world based on the map points, and displaying the virtual object based at least in part on a property of the recognized object.

In a 45th aspect, the method of any of aspects 39-44, wherein the map points pertain to a geometry of the detected location.

In a 46th aspect, a method of displaying augmented reality comprises storing a passable world model data, wherein the passable world model data comprises a set of points pertaining to real objects of the physical world, wherein the set of points are captured by a plurality of augmented reality display systems, processing the passable world model data to recognize at least one object based at least in part on a known geometry of an object, and displaying a virtual content to a user of a particular augmented reality display system based at least in part on a parameter corresponding to the recognized object.

In a 47th aspect, an augmented reality system comprises one or more sensors of a head-mounted augmented reality display system to capture a set of data pertaining to a user of the head-mounted augmented reality display system, wherein a pose of the one or more sensors is known relative to the user, a processor to calculate a set of parameters regarding a movement of the user based at least in part on the captured set of data, and animating an avatar based at least in part on the calculated set of parameters regarding the movement of the user, wherein the animated avatar is displayed as a virtual object when viewed through one or more augmented reality display systems.

In a 48th aspect, an augmented reality (AR) system comprises a database to store a set of waypoints corresponding to a plurality of locations on a bounding box, wherein the waypoint data is a uniquely positioned virtual location on the bounding box, one or more sensors communicatively coupled to an augmented reality display system capture data when directed to a particular location, and a processor configured to capture data with a first sensor when a second sensor detects a waypoint.

In a 49th aspect, the AR system of aspect 48, wherein the method further comprises constructing a geometry of one or more objects based at least in part on the one or more map points collected concurrent with observation of a waypoint.

In a 50th aspect, the AR system of any of aspects 48-49, wherein the captured set of map points are extracted from one or more images captured through the augmented reality system.

In a 51st aspect, a method of displaying augmented reality comprises capturing a set of map points from the real world through a plurality of augmented reality systems, and constructing a geometric map of the real world based at least in part on the captured set of map points, wherein a node of a geometric map comprises a keyframe that captured at least a first set of map points, and a strength of a connection between two nodes of the geometric map corresponds to a number of shared map points between the two nodes.

In a 52nd aspect, the method of aspect 51, wherein the method further comprises identifying a point of stress in the constructed geometric map.

In a 53rd aspect, the method of any of aspects 51-52, wherein the point of stress is identified based at least in part on information retrieved from a topological map.

In a 54th aspect, the method of any of aspects 51-53, wherein the point of stress is identified based at least in part on a discrepancy in a location of a particular keyframe in relation to the geometric map.

In a 55th aspect, the method of any of aspects 51-54, wherein the point of stress is identified based on a maximum residual error of the geometric map.

In a 56th aspect, the method of any of aspects 51-55, wherein a keyframe is the position and orientation of the augmented reality display system concurrent with observing a waypoint.

In a 57th aspect, an augmented reality (AR) system comprising: an AR display configured to present virtual content to a user of the AR system; an outward facing camera configured to capture one or more images of an environment of the user; and a hardware processor in communication with the AR display and the outward facing camera, the hardware processor programmed to: generate a three-dimensional (3D) bounding box within the user's environment based on at least one image captured by the outward facing camera; determine a first waypoint location on a first surface of the 3D bounding box; determine a second waypoint location on a second surface of the 3D bounding box; generate a guidance indicator configured to direct the user to move the outward facing camera to point at the first or the second waypoint location; capture map data at the first or the second waypoint location; and generate a mesh map based at least partly on the map data using one or more object recognizers, wherein the mesh map comprises a virtual representation of at a portion of the user's physical environment.

In a 58th aspect, the system of aspect 57, wherein the 3D bounding box comprises a cuboid.

In a 59th aspect, the system of aspect 57, wherein the 3D bounding box comprises an ellipsoid.

In a 60th aspect, the system of aspect 59, wherein the ellipsoid includes the first surface and the second surface. For example, the first surface can include a portion of the ellipsoid in front of the user. In another example, the second surface can include a portion of the ellipsoid behind the user.

In a 61st aspect, the system of aspect 57, wherein the 3D bounding box has an origin within the user's environment at the AR display.

In a 62nd aspect, the system of any of aspects 57-61, wherein the hardware processer is programmed to include a body of the user within the 3D bounding box.

In a 63rd aspect, the system of any of aspects 57-62, wherein the hardware processor is programmed to include at least a portion of the mesh map within the 3D bounding box.

In a 64th aspect, the system of any of aspects 57-63, wherein the hardware processor is programmed to determine a representation of a first waypoint at the first waypoint location and cause to render the first waypoint by the AR display.

In a 65th aspect, the system of aspect 64, wherein the representation of the first waypoint comprises a ring surrounding an eye graphic.

In a 66th aspect, the system of any of aspects 57-65, wherein the hardware processor is programmed to determine a representation of the second waypoint at the second waypoint location and cause to render the second waypoint on the AR display.

In a 67th aspect, the system of any of aspects 57-66, wherein the hardware processor is configured to: determine the first waypoint location at an approximately 0 degree angle from an initial facing direction of the outward facing camera; determine the second waypoint location at an approximately 90 degree azimuthal angle from the initial facing direction of the outward facing camera; determine a third waypoint location at an approximately 180 degree azimuthal angle from the initial facing direction of the outward facing camera; determine a fourth waypoint location at an approximately 270 degree azimuthal angle from the initial facing direction of the outward facing camera; determine a fifth waypoint location at an approximately 90 degree polar angle from the initial facing direction of the outward facing camera; and determine a sixth waypoint location at an approximately 270 degree polar angle from the initial facing direction of the outward facing camera.

In a 68th aspect, the system of any of aspects 57-67, wherein the guidance indicator comprises a graphic.

In a 69th aspect, the system of any of aspects 57-68, wherein the graphic comprises a ring and chevron.

In a 70th aspect, the system of any of aspects 57-69, wherein the guidance indicator comprises haptic feedback.

In a 71st aspect, the system of any of aspects 57-70, wherein the guidance indicator comprises audio.

In a 72nd aspect, the system of any of aspects 57-71, wherein the hardware processor is programmed to determine a nearest waypoint location of the first and second waypoint locations and wherein the guidance indicator is configured to direct the user to move the outward facing camera to observe the nearest waypoint location.

In a 73rd aspect, the system of any of aspects 57-72, wherein to determine a nearest waypoint location, the hardware processor is programmed to: determine a first Euclidean distance between a current orientation of the outward facing camera and the first waypoint location; determine a second Euclidean distance between the current orientation of the outward facing camera and the second waypoint location; select the first waypoint location if the first Euclidean distance is smaller than the second Euclidean distance; and select the second waypoint location if the second Euclidean distance is smaller than the first Euclidean distance.

In a 74th aspect, the system of any of aspects 57-73, wherein the hardware processor is programmed to determine if the mesh map is complete.

In a 75th aspect, the system of any of aspects 57-74, wherein the hardware processor is configured to notify the user, in response to the determination if the mesh map is complete, that the mesh map is complete.

In a 76th aspect, the system of any of aspects 57-75, wherein the hardware processor is configured to notify the user, in response to the determination if the mesh map is complete, that the mesh map is incomplete.

In a 77th aspect, the system of any of aspects 57-76, wherein to determine if the mesh map is complete, the hardware processor is programmed to determine a quality of the map data.

In a 78th aspect, the system of any of aspects 57-77, wherein the hardware processor is programmed to periodically capture map data until a completion condition is met.

In a 79th aspect, the system of any of aspects 57-78, wherein the completion condition comprises an amount of time.

In an 80th aspect, the system of any of aspects 57-79, wherein the amount of time comprises approximately 5 seconds.

In an 81st aspect, a method comprising: under control of an augmented reality (AR) device comprising a hardware processor and an AR display configured to present virtual content in an environment of a user: determining a three-dimensional (3D) region within a user's environment based on at least one image captured by an outward facing camera associated with the AR display system; determining a first waypoint location on a first surface of the 3D region; determining a second waypoint location on a second surface of the 3D region; generating a guidance indicator configured to direct the user to move the outward facing camera to point at the first or second waypoint location; capturing map data at the first or second waypoint location; and generating a mesh map based on the map data using one or more object recognizers, wherein the mesh map comprises a virtual representation of the user's environment.

In an 82nd aspect, an augmented reality (AR) system comprising: an AR display configured to present virtual content to a user of the AR system; an outward facing camera configured to capture one or more images of the user's environment; and a hardware processor in communication with the AR display and the outward facing camera, the hardware processor programmed to: receive at least one image of the one or more images captured by the outward facing camera; determine a three dimensional (3D) region within the user's environment to map based on the at least one image; generate a plurality of waypoints, each of the plurality of waypoints comprising at least one visual indicator having a spatial location in the 3D region; and cause the AR display to render a guidance visual, wherein the guidance visual is configured to direct the user to move the image capture device towards a first waypoint of the plurality of waypoints.

In an 83rd aspect, a method comprising: under control of an augmented reality (AR) device comprising a hardware processor and an AR display configured to present virtual content in an environment of a user: receiving at least one image of the one or more images captured by the outward facing camera; determining a three dimensional (3D) region within the user's environment to map based on the at least one image; generating a plurality of waypoints, each of the plurality of waypoints comprising at least one visual indicator having a spatial location in the 3D region; and causing the AR display to render a guidance visual, wherein the guidance visual is configured to direct the user to move the image capture device towards a first waypoint of the plurality of waypoints.

Any of the above aspects can be combined with any of the other aspects or any of the other features described in this application. The aspects are not intended to exclude additional elements described herein. All possible combinations and subcombinations of the aspects, with or without additional features described herein, are contemplated and considered part of this disclosure.

Q. Other Considerations

Each of the processes, methods, and algorithms described herein or depicted in the attached figures may be embodied in, and fully or partially automated by, code modules executed by one or more physical computing systems, hardware computer processors, application-specific circuitry, or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations or embodiments shown herein but are to be accorded the widest scope consistent with this disclosure, the principles and the novel features disclosed herein.

Certain features that are described in this specification in the context of separate implementations or embodiments also can be implemented in combination in a single implementation or embodiment. Conversely, various features that are described in the context of a single implementation or embodiment also can be implemented in multiple implementations or embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without author input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An augmented reality (AR) system comprising:
an augmented reality display system within a physical environment of a user, the augmented reality display system comprising:
at least one sensor configured to capture data pertaining to the physical environment of the user; and
a server comprising a processor configured to:
receive the captured data from the augmented reality display system;
construct or retrieve at least a portion of a map of the physical environment of the user based at least in part on the received captured data;
generate a bounding box at a location of the user in the physical environment;
expand at least a first portion of the bounding box to encompass a first digital marker associated with the captured data at a first location in the environment of the user;
expand at least a second portion of the bounding box to encompass a second digital marker associated with the captured data at a second location in the environment of the user;
display at least one virtual object on a surface of the bounding box; and
prompt the user to capture further data pertaining to the physical environment using the at least one virtual object.

2. The augmented reality system of claim 1, wherein the bounding box comprises a cuboid.

3. The augmented reality system of claim 1, wherein the bounding box comprises an ellipsoid.

4. The augmented reality system of claim 1, wherein the map comprises a mesh map, sparse map, or a dense map.

5. The augmented reality system of claim 4, wherein the first digital marker or the second digital marker comprises a sparse point representing a physical space in the physical environment.

6. The augmented reality system of claim 1, wherein the at least one virtual object comprises at least one waypoint.

7. The augmented reality system of claim 6, wherein to prompt the user, the processor is configured to display a virtual guide object to direct the user to capture data near the at least one waypoint.

8. The augmented reality system of claim 7, wherein the virtual guide object comprises a virtual reticle.

9. The augmented reality system of claim 1, wherein the processor is configured to:
update the map of the physical environment or confirm a pre-loaded map is correct for the physical environment or confirm a position of the augmented reality display system with the pre-loaded map.

10. The augmented reality system of claim 9, wherein to update the map, the processor is configured to extract a set of map points from the further captured data and add the set of map points to the map.

11. A method of mapping a physical environment of a user, the method comprising:
receiving captured data from an augmented reality display system;
constructing or retrieving at least a portion of a map of the physical environment of the user based at least in part on the received captured data;
generating a bounding box at a location of the user in the physical environment;
expanding at least a first portion of the bounding box to encompass a first digital marker associated with the captured data at a first location in the physical environment of the user;
expanding at least a second portion of the bounding box to encompass a second digital marker associated with the capture data at a second location in the physical environment of the user;
displaying at least one virtual object on a surface of the bounding box; and
prompting the user to capture further data pertaining to the physical environment using the at least one virtual object.

12. The method of claim 11, wherein the bounding box comprises a cuboid.

13. The method of claim 12, further comprising:
updating the map of the physical environment or confirming a pre-loaded map is correct for the physical environment or confirming a position of the augmented reality display system with the pre-loaded map.

14. The method of claim 12, wherein updating the map comprises extracting a set of map points from the further captured data and adding the set of map points to the map.

15. The method of claim 11, wherein the bounding box comprises an ellipsoid.

16. The method of claim 11, wherein the map comprises a mesh map, sparse map, or a dense map.

17. The method of claim 11, wherein the first digital marker or the second digital marker comprises a sparse point representing a physical space in the physical environment.

18. The method of claim 11, wherein the at least one virtual object comprises at least one waypoint.

19. The method of claim 18, wherein prompting the user comprises displaying a virtual guide object to direct the user to capture data near the at least one waypoint.

20. The method of claim 19, wherein the virtual guide object comprises a virtual reticle.

* * * * *